United States Patent
Beall et al.

(10) Patent No.: US 9,133,054 B2
(45) Date of Patent: Sep. 15, 2015

(54) WHITE, OPAQUE, β-SPODUMENE/RUTILE GLASS-CERAMIC ARTICLES AND METHODS FOR MAKING THE SAME

(71) Applicant: CORNING INCORPORATED, Corning, NY (US)

(72) Inventors: George Halsey Beall, Big Flats, NY (US); Marie Jacqueline Monique Comte, Fontenay aux Roses (FR); George Owen Dale, Horseheads, NY (US); Linda Ruth Pinckney, Pittsford, NY (US); Charlene Marie Smith, Corning, NY (US); Ronald Leroy Stewart, Elmira, NY (US); Steven Alvin Tietje, Lindley, NY (US)

(73) Assignee: Corning Incorporated, Corning, NY (US)

( * ) Notice: Subject to any disclaimer, the term of this patent is extended or adjusted under 35 U.S.C. 154(b) by 16 days.

(21) Appl. No.: 14/068,558

(22) Filed: Oct. 31, 2013

(65) Prior Publication Data
US 2014/0057092 A1 Feb. 27, 2014

Related U.S. Application Data

(63) Continuation of application No. 13/933,600, filed on Jul. 2, 2013, now Pat. No. 8,664,131, which is a continuation of application No. 13/837,863, filed on Mar. 15, 2013, now Pat. No. 8,664,130.

(60) Provisional application No. 61/623,905, filed on Apr. 13, 2012.

(51) Int. Cl.
| | |
|---|---|
| C03C 10/12 | (2006.01) |
| C03C 14/00 | (2006.01) |
| C03C 10/00 | (2006.01) |
| C03B 32/02 | (2006.01) |
| C03B 20/00 | (2006.01) |
| C03C 3/085 | (2006.01) |
| C03C 3/093 | (2006.01) |
| C03C 21/00 | (2006.01) |

(52) U.S. Cl.
CPC ............ *C03C 14/006* (2013.01); *C03B 20/00* (2013.01); *C03B 32/02* (2013.01); *C03C 3/085* (2013.01); *C03C 3/093* (2013.01); *C03C 10/0009* (2013.01); *C03C 10/0027* (2013.01); *C03C 14/00* (2013.01); *C03C 21/002* (2013.01); *Y10T 428/315* (2013.01)

(58) Field of Classification Search
CPC ............ C03C 10/0045; C03C 10/0009; C03C 10/0018; C03C 10/0054; C03C 10/0027; C03C 3/083; C03C 3/093; C03C 3/085; C03C 3/087; C03C 4/02
USPC ................................ 501/5, 6, 7, 68, 69, 70, 71
See application file for complete search history.

(56) References Cited

U.S. PATENT DOCUMENTS

| | | | |
|---|---|---|---|
| 3,157,522 A | 11/1964 | Stookey | |
| 3,715,220 A | 2/1973 | Confer et al. | |
| 3,839,056 A | 10/1974 | Grossman | |
| 3,931,438 A | 1/1976 | Beall et al. | |
| 3,985,533 A | 10/1976 | Grossman | |
| 4,126,477 A | 11/1978 | Reade | |
| 4,467,039 A | 8/1984 | Beall et al. | |
| 4,977,110 A | 12/1990 | Amundson et al. | 501/7 |
| 5,070,045 A | 12/1991 | Comte et al. | |
| 5,173,453 A | 12/1992 | Beall et al. | |
| 5,972,816 A | 10/1999 | Goto | |
| 6,060,412 A | 5/2000 | Ishida | |
| 6,387,509 B1 | 5/2002 | Goto et al. | |
| 6,420,287 B1 | 7/2002 | Sakamoto et al. | |
| 6,846,760 B2 | 1/2005 | Siebers et al. | |
| 7,205,252 B2 | 4/2007 | Becker et al. | |
| 7,456,121 B2 * | 11/2008 | Comte | 501/4 |
| 7,465,686 B2 | 12/2008 | Comte | |
| 7,476,633 B2 | 1/2009 | Comte et al. | |
| 7,507,681 B2 * | 3/2009 | Aitken et al. | 501/4 |
| 8,021,999 B2 | 9/2011 | Beall | |
| 8,048,816 B2 | 11/2011 | Beall et al. | |
| 2005/0153142 A1 | 7/2005 | Belykh et al. | |
| 2007/0105700 A1 | 5/2007 | Horsfall et al. | 501/7 |
| 2007/0213192 A1 | 9/2007 | Comte et al. | |
| 2010/0069218 A1 | 3/2010 | Baldi et al. | |

| | | |
|---|---|---|
| 2010/0224619 A1 | 9/2010 | Schoenberger et al. |
| 2011/0092353 A1 | 4/2011 | Amin et al. |
| 2011/0293942 A1 | 12/2011 | Cornejo et al. |

FOREIGN PATENT DOCUMENTS

| | | |
|---|---|---|
| EP | 0076692 | 6/1986 |
| EP | 0326735 | 2/1991 |
| EP | 0634374 | 6/1994 |
| EP | 1901999 | 11/2009 |
| WO | 2013/136013 | 9/2013 |

OTHER PUBLICATIONS

"Agilent Agilent Basics of Measuring the Dielectric Properties of Materials"; Application Note; Agilent Technologies; www.agilent.com 34 Pages. Baker-Jarvis et al; "Analysis of an Open-Ended Coaxial Probe With Lift-Off for Nondestructive Testing"; IEEE Transactions on Instrumentation and Measurement, vol. 43, No. 5 Oct. 1994 pp. 711-718.
Baker-Jarvis et al; "Dielectric and Conductor-Loss Characterization and Measurements on Electronic Packaging Materials"; NIST Technical Note 1520; Jul. 2001; 158 Pages.
Baker-Jarvis et al; "High-Frequency Dielectric Measurements"; IEEE Instrumentation & Measurement Magazing, Apr. 2010 pp. 24-31.
Baker-Jarvis et al; "Measureing the Permittivity and Permeability of Lossy Materials: Solids, Liquids, Metals, Building Materials, and Negative-Index Materials"; NIST Technical Note 1536; 156 Pages.
Baker-Jarvis et al; "Transmission/Reflection and Short-Circuit Line Methods for Measuring Permittivity and Permeability"; NIST Technical Note 1355-R; 118 Pages.
H.E. Bussey; "Measurement of RF Properties of Materials a Survey"; Proceedings of the IEEE, vol. 55, No. 6; Jun. 1967; pp. 1046-1053.
J. Crank "The Mathematics of Diffusion" Second Edition Book.
Toru Kishii "Surface Stress Meters Utilising the Optical Waveguide Effect of Chemically Tempered Glasses"; Optics and Lasers in Engineering, 4 (1983) 25-38.
Kobayashi et al; "Chemical Strengthening of Glass and Industrial Appilcation"; Toshiba Researc and Development Center; Glass Engineering Dept.; pp. 109-112.
Orihara FSM 6000LE Surface Stress Meter Brochure.
Orihara FSM 7000H Surface Stress Meter Brochure.
Orihara Surface Stress Meter Brochure.
J.C. Taylor; "Rietveld Made Easy a Practical Guide to the Understanding of the Method and Successful Phase Quantifications"; 3 Pages.
Sglavo et al; "Procedure for Residual Stress Profile Determination by Curvature Measurements"; Mechanics of Materials, 37, (2005) 887-898.
Standard Test Method for Annealing Point and Strain Point of Glass by Beam Bending; Designation: C598-93 ASTM.
Standard Test Method for Dynamic Young's Modulus, Shear Modulus, and Poisson's Ratio for Advanced Ceramics by Impulse Excitation of Vibration, Designation: C1259-08 ASTM.
Standard Test Method for Linear Thermal Expansion of Solid Materials With a Push-Rod Dilatometer, Designation: E228-11, ASTM.
Standard Test Method for Monotonic Equibiaxial Flexural Strength of Advanced Ceramics at Ambient Temperature Designation: C1499-09, ASTM.
Standard Test Method for Plane-Strain Fracture Toughness of Metalic Materials Designation: E399-90 ASTM.
Standard Test Method for Vickers Indentation Hardness of Advanced Ceramics Designation: C1327-08 ASTM.
Standard Test Method for Determination of Fracture Toughness of Advanced Ceramics at Ambient Temperature Designation: C1421-10 ASTM.

* cited by examiner

*Primary Examiner* — Noah Wiese
(74) *Attorney, Agent, or Firm* — Timothy M. Schaeberle

(57) ABSTRACT

Crystallizable glasses, glass-ceramics, IXable glass-ceramics, and IX glass-ceramics are disclosed. The glass-ceramics exhibit β-spodumene ss as the predominant crystalline phase. These glasses and glass-ceramics, in mole %, include: 62-75 $SiO_2$; 10.5-17 $Al_2O_3$; 5-13 $Li_2O$; 0-4 ZnO; 0-8 MgO; 2-5 $TiO_2$; 0-4 $B_2O_3$; 0-5 $Na_2O$; 0-4 $K_2O$; 0-2 $ZrO_2$; 0-7 $P_2O_5$; 0-0.3 $Fe_2O_3$; 0-2 MnOx; and 0.05-0.2 $SnO_2$. Additionally, these glasses and glass-ceramics exhibit the following criteria:
  a. a ratio:

$$\frac{[Li_2O + Na_2O + K_2O + MgO + ZnO]}{[Al_2O_3 + B_2O_3]}$$

between 0.7 to 1.5;
  b.

$$a \text{ ratio:} \frac{[TiO_2 + SnO_2]}{[SiO_2 + B_2O_3]}$$

greater than 0.04.
Furthermore, the glass-ceramics exhibit an opacity ≥about 85% over the wavelength range of 400-700 nm for an about 0.8 mm thickness and colors an observer angle of 10° and a CIE illuminant F02 determined with specular reflectance included of a* between −3 and +3, b* between −6 and +6, and L* between 88 and 97.

18 Claims, 10 Drawing Sheets

WHITE, OPAQUE, β-SPODUMENE/RUTILE GLASS-CERAMIC ARTICLES AND METHODS FOR MAKING THE SAME

This application is a continuation of U.S. patent application Ser. No. 13/933,600 filed on Jul. 2, 2013, to which the benefit of priority under 35 U.S.C. §120 is hereby claimed, which claims the benefit of priority under 35 U.S.C. §120 and is a continuation of U.S. patent application Ser. No. 13/837,863 filed on Mar. 15, 2013, which claims the benefit of priority under 35 U.S.C. §119 of U.S. Provisional Application Ser. No. 61/623,905 filed on Apr. 13, 2012, the contents of which are relied upon and incorporated herein by reference in their entirety.

TECHNICAL FIELD

The present disclosure relates to crystallizable glasses (precursor glasses crystallizable to glass-ceramics), glass-ceramics, ion exchangeable ("IXable") glass-ceramics, and/or ion exchanged ("IX") glass-ceramics; process for making the same; and articles comprising the same. In particular, the present disclosure relates to crystallizable glasses (precursor glasses formulated to be crystallizable to white, opaque glass-ceramics including β-spodumene solid solution as a predominant crystalline phase and a Ti-containing crystalline phase, which includes rutile, as a minor crystalline phase), white, opaque, β-spodumene glass-ceramics, IXable, white, opaque, β-spodumene glass-ceramics, and/or IX, white, opaque, β-spodumene glass-ceramics; process for making the same; and articles comprising the same.

BACKGROUND

In the past decade, as electronic devices such as notebook computers, personal digital assistants (PDAs), portable navigation device (PNDs), media players, mobile phones, portable inventory devices (PIDs) . . . etc. (frequently referred to as "portable computing devices") have converged while at the same time becoming small, light, and functionally more powerful. One factor contributing to the development and availability of such smaller devices is an ability to increase computational density and operating speed by ever decreasing electronic component sizes. However, the trend to smaller, lighter, and functionally more powerful electronic devices presents a continuing challenge regarding design of some components of the portable computing devices.

Components associated with portable computing devices encountering particular design challenges include the enclosure or housing used to house the various internal/electronic components. This design challenge generally arises from two conflicting design goals—the desirability of making the enclosure or housing lighter and thinner, and the desirability of making the enclosure or housing stronger and more rigid. Lighter enclosures or housings, typically thin plastic structures with few fasteners, tend to be more flexible while having a tendency to buckle and bow as opposed to stronger and more rigid enclosure or housings, typically thicker plastic structures with more fasteners having more weight. Unfortunately, the increased weight of the stronger, more rigid plastic structures might lead to user dissatisfaction, while the bowing and buckling of the lighter structures might damage the internal/electronic components of the portable computing devices and almost certainly leading to user dissatisfaction.

Among known classes of materials are glass-ceramics that are used widely in various other applications. For example, glass-ceramics are used widely in kitchens as cooktops, cookware, and eating utensils, such as bowls, dinner plates, and the like. Transparent glass-ceramics are used in the production of oven and/or furnace windows, optical elements, mirror substrates, and the like. Glass-ceramics are typically made by crystallizing crystallizable glasses at specified temperatures for specified periods of time to nucleate and grow crystalline phases in a glass matrix. Two glass-ceramics based on the $SiO_2$—$Al_2O_3$—$Li_2O$ glass system comprise those having either β-quartz solid solution ("β-quartz ss" or "β-quartz") as the predominant crystalline phase or β-spodumene solid solution ("β-spodumene ss" or "β-spodumene") as the predominant crystalline phase.

As stated, in view of the foregoing problems with existing enclosures or housings, there exists a need for materials such as crystallizable glasses (precursor glasses formulated to be crystallizable to glass-ceramics) and/or β-spodumene glass-ceramics and/or IXable, β-spodumene glass-ceramics and/or IX, β-spodumene glass-ceramics that provide, potentially in a more cost effective manner, improved enclosures or housings for portable computing devices. Also, there exists a need for such materials that provide improved whiteness levels and/or opaque colors while addressing in an aesthetically pleasing manner the design challenges of creating light, strong, and rigid enclosures or housings.

SUMMARY

Some aspects of embodiments and/or embodiments ("aspects and/or embodiments") of this disclosure relate to crystallizable glasses formulated to be crystallizable to white, opaque, β-spodumene glass-ceramics having β-spodumene as the predominant crystalline phase. Such crystallizable glasses, in mole percent (mole %), include: 62-75 $SiO_2$; 10.5-17 $Al_2O_3$; 5-13 $Li_2O$; 0-4 ZnO; 0-8 MgO; 2-5 $TiO_2$; 0-4 $B_2O_3$; 0-5 $Na_2O$; 0-4 $K_2O$; 0-2 $ZrO_2$; 0-7 $P_2O_5$; 0-0.3 $Fe_2O_3$; 0-2 MnOx; and 0.05-0.2 $SnO_2$, while in alternative aspects, in mole %, including: 67-74 $SiO_2$; 11-15 $Al_2O_3$; 5.5-9 $Li_2O$; 0.5-2 ZnO; 2-4.5 MgO; 3-4.5 $TiO_2$; 0-2.2 $B_2O_3$; 0-1 $Na_2O$; 0-1 $K_2O$; 0-1 $ZrO_2$; 0-4 $P_2O_5$; 0-0.1 $Fe_2O_3$; 0-1.5 MnOx; and 0.08-0.16 $SnO_2$.

Additionally, the crystallizable glasses exhibit the following compositional criteria:

(1) the ratio of $$\frac{\text{the mole sum total of } [Li_2O + Na_2O + K_2O + MgO + ZnO]}{\text{to the mole sum total of } [Al_2O_3 + B_2O_3]}$$

might be between 0.7 to 1.5 and in some alternative aspects between 0.75 to 1.05 while in other alternative aspects between 0.8 to 1; and (2) the ratio of:

$$\frac{\text{the mole sum total of } [TiO_2 + SnO_2]}{\text{to the mole sum total of } [SiO_2 + B_2O_3]}$$

can be greater than 0.04 and in some alternative aspects greater than 0.05.

In some aspects, the crystallizable glasses are crystallizable to white, opaque, β-spodumene glass-ceramics exhibiting the following crystal phase assemblage:

(1) β-spodumene solid solutions exhibiting Li$_2$O:Al$_2$O$_3$: SiO$_2$ ratios ranging from 1:1:4.5-1:1:8 or, alternatively, from 1:1:4.5-1:1:7, and comprising at least 70 wt % of the crystalline phases;
(2) at least one Ti-containing crystalline phase comprising:
   a. about 2.5-8 wt % of the crystalline phases of the glass-ceramic,
   b. an acicular morphology exhibiting a length ≥ about 50 nm, and
   c. rutile; and optionally,
(3) one or more crystalline phases exhibiting a spinel structure and comprising 1-10 wt % of the crystalline phase.

In further aspects, crystallizable glasses are crystallizable to white, opaque, β-spodumene glass-ceramic exhibiting opaqueness and an opacity ≥85% for a 0.8 mm thickness over the wavelength range of 400-700 nm.

Some other aspects and/or embodiments of this disclosure relate to white, opaque, β-spodumene glass-ceramics having β-spodumene as the predominant crystalline phase. Such white, opaque, β-spodumene glass-ceramics, in mole %, include: 62-75 SiO$_2$; 10.5-17 Al$_2$O$_3$; 5-13 Li$_2$O; 0-4 ZnO; 0-8 MgO; 2-5 TiO$_2$; 0-4 B$_2$O$_3$; 0-5 Na$_2$O; 0-4 K$_2$O; 0-2 ZrO$_2$; 0-7 P$_2$O$_5$; 0-0.3 Fe$_2$O$_3$; 0-2 MnOx; and 0.05-0.2 SnO$_2$, while in alternative aspects, in mole %, including: 67-74 SiO$_2$; 11-15 Al$_2$O$_3$; 5.5-9 Li$_2$O; 0.5-2 ZnO; 2-4.5 MgO; 3-4.5 TiO$_2$; 0-2.2 B$_2$O$_3$; 0-1 Na$_2$O; 0-1 K$_2$O; 0-1 ZrO$_2$; 0-4 P$_2$O$_5$; 0-0.1 Fe$_2$O$_3$; 0-1.5 MnOx; and 0.08-0.16 SnO$_2$.

Additionally, such white, opaque, β-spodumene glass-ceramics exhibit the following compositional criteria:
(1) the ratio of $$\frac{\text{the mole sum total of } [Li_2O + Na_2O + K_2O + MgO + ZnO]}{\text{to the mole sum total of } [Al_2O_3 + B_2O_3]}$$

can be between 0.7 to 1.5 and in some alternative aspects between 0.75 to 1.05 while in other alternative aspects between 0.8 to 1; and
(2) the ratio of:

$$\frac{\text{the mole sum total of } [TiO_2 + SnO_2]}{\text{to the mole sum total of } [SiO_2 + B_2O_3]}$$

can be greater than 0.04 and in some alternative aspects greater than 0.05.

In some aspects, such white, opaque, β-spodumene glass-ceramics exhibit the following crystal phase assemblage:
(1) β-spodumene solid solutions exhibiting Li$_2$O:Al$_2$O$_3$: SiO$_2$ ratios ranging from 1:1:4.5-1:1:8 or, alternatively, from 1:1:4.5-1:1:7, and comprising at least 70 wt % of the crystalline phases;
(2) at least one Ti-containing crystalline phase comprising:
   a. about 2.5-8 wt % of the crystalline phases of the glass-ceramic,
   b. an acicular morphology exhibiting a length ≥ about 50 nm, and
   c. rutile; and optionally,
(3) One or more crystalline phases exhibiting a spinel structure and comprising 1-10 wt % of the crystalline phases.

In further aspects, such white, opaque, β-spodumene glass-ceramics exhibit opaqueness and an opacity ≥85% for a 0.8 mm thickness over the wavelength range of 400-700 nm. In still further aspects, at a portion of a surface of such white, opaque, β-spodumene glass-ceramics is subjectable to an ion exchange ("IX") treatment thus yielding ion exchanged ("IX"), white, opaque, β-spodumene glass-ceramics.

Still other aspects and/or embodiments of this disclosure relate to methods for forming crystallizable glasses formulated to be crystallizable to white, opaque, β-spodumene glass-ceramics and methods for forming white, opaque, β-spodumene glass-ceramics having a β-spodumene as the predominant crystalline phase. In aspects, some methods included melting a mixture of raw materials formulated to produce upon melting crystallizable glasses, in mole %, including: 62-75 SiO$_2$; 10.5-17 Al$_2$O$_3$; 5-13 Li$_2$O; 0-4 ZnO; 0-8 MgO; 2-5 TiO$_2$; 0-4 B$_2$O$_3$; 0-5 Na$_2$O; 0-4 K$_2$O; 0-2 ZrO$_2$; 0-7 P$_2$O$_5$; 0-0.3 Fe$_2$O$_3$; 0-2 MnOx; and 0.05-0.2 SnO$_2$, while in alternative aspects, in mole %, including: 67-74 SiO$_2$; 11-15 Al$_2$O$_3$; 5.5-9 Li$_2$O; 0.5-2 ZnO; 2-4.5 MgO; 3-4.5 TiO$_2$; 0-2.2 B$_2$O$_3$; 0-1 Na$_2$O; 0-1 K$_2$O; 0-1 ZrO$_2$; 0-4 P$_2$O$_5$; 0-0.1 Fe$_2$O$_3$; 0-1.5 MnOx; and 0.08-0.16 SnO$_2$.

In additional aspects, such mixture of raw materials is formulated to produce upon melting crystallizable glasses exhibiting the following compositional criteria:
(1) the ratio of $$\frac{\text{the mole sum total of } [Li_2O + Na_2O + K_2O + MgO + ZnO]}{\text{to the mole sum total of } [Al_2O_3 + B_2O_3]}$$

might be between 0.7 to 1.5 and in some alternative aspects between 0.75 to 1.05 while in other alternative aspects between 0.8 to 1; and
(2) the ratio of:

$$\frac{\text{the mole sum total of } [TiO_2 + SnO_2]}{\text{to the mole sum total of } [SiO_2 + B_2O_3]}$$

can be greater than 0.04 and in some alternative aspects greater than 0.05.

In still other aspects, such mixture of raw materials is formulated to produce the above crystallizable glasses upon fining and homogenization molten glass compositions at a temperature below about 1600° C. Still yet other aspects included forming molten crystallizable glasses into one or more glass articles.

In further aspects, some other methods included methods for forming glass-ceramics having a β-spodumene as the predominant crystalline phase by transforming crystallizable glasses. Such other methods including (i) heating a glass article comprising and/or a crystallizable glass formulated to be crystallizable to a glass-ceramics having a β-spodumene as the predominant crystalline phase at a rate of 1-10° C./min to a nucleation temperature (Tn) ranging between 700° C. and 810° C.; (ii) maintaining the glass article comprising and/or the crystallizable glass at the nucleation temperature for a time ranging between ¼ h to 2 h to produce a glass article comprising and/or a nucleated crystallizable glass; (iii) heating the glass article comprising and/or a nucleated crystallizable glass at a rate of 1-10° C./min to a crystallization temperature (Tc) ranging between 850° C. and 1250° C.; (iv) maintaining the glass article comprising and/or the nucleated crystallizable glass at the crystallization temperature for a time ranging between about ¼ hour(h) to 4 h to produce an article comprising and/or a β-spodumene glass-ceramic having a β-spodumene as the predominant crystalline phase; and (v) cooling the article comprising and/or a glass-ceramic to room temperature.

In some aspects, such white, opaque, β-spodumene glass-ceramics exhibit the following crystal phase assemblage:
(1) β-spodumene solid solutions exhibiting $Li_2O:Al_2O_3:SiO_2$ ratios ranging from 1:1:4.5-1:1:8 or, alternatively, from 1:1:4.5-1:1:7, and comprising at least 70 wt % of the crystalline phase;
(2) at least one Ti-containing crystalline phase comprising:
   a. about 2.5-8 wt % of the crystalline phases of the glass-ceramic,
   b. an acicular morphology exhibiting a length ≥about 50 nm, and
   c. rutile; and optionally,
(3) One or more crystalline phases exhibiting a spinel structure and comprising 1-10 wt % of the crystalline phase.

In further aspects, such white, opaque, β-spodumene glass-ceramics exhibit opaqueness and an opacity ≥85% for a 0.8 mm thickness over the wavelength range of 400-700 nm.

The article comprising and/or white, opaque, β-spodumene glass-ceramics, IXable, white, opaque, β-spodumene glass-ceramics, and/or IX, white, opaque, β-spodumene glass-ceramics might be used in a variety of electronic devices or portable computing devices, which might be configured for wireless communication, such as, computers and computer accessories, such as, "mice", keyboards, monitors (e.g., liquid crystal display (LCD), which might be any of cold cathode fluorescent lights (CCFLs-backlit LCD), light emitting diode (LED-backlit LCD) . . . etc, plasma display panel (PDP) . . . and the like), game controllers, tablets, thumb drives, external drives, whiteboards . . . etc.; personal digital assistants (PDAs); portable navigation device (PNDs); portable inventory devices (PIDs); entertainment devices and/or centers, devices and/or center accessories such as, tuners, media players (e.g., record, cassette, disc, solid-state . . . etc.), cable and/or satellite receivers, keyboards, monitors (e.g., liquid crystal display (LCD), which might be any of cold cathode fluorescent lights (CCFLs-backlit LCD), light emitting diode (LED-backlit LCD) . . . etc, plasma display panel (PDP) and the like), game controllers . . . etc.; electronic reader devices or e-readers; mobile or smart phones . . . etc. As alternative examples, white, opaque, β-spodumene glass-ceramics, IXable, white, opaque, β-spodumene glass-ceramics, and/or IX, white, opaque, β-spodumene glass-ceramics might be used in automotive, appliances, and even architectural applications.

Numerous other aspects of embodiments, embodiments, features, and advantages of this disclosure will appear from the following description and the accompanying drawings. In the description and/or the accompanying drawings, reference is made to exemplary aspects and/or embodiments of this disclosure which can be applied individually or combined in any way with each other. Such aspects and/or embodiments do not represent the full scope of this disclosure. Reference should therefore be made to the claims herein for interpreting the full scope of this disclosure. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a recitation in this disclosure of a range of from about 1 to 5 shall be considered to support claims to any of the following ranges: 1-5; 1-4; 1-3; 1-2; 2-5; 2-4; 2-3; 3-5; 3-4; and 4-5. Also in the interest of brevity and conciseness, it is to be understood that such terms as "is," "are," "includes," "having," "comprises," and the like are words of convenience and are not to be construed as limiting terms and yet may encompass the terms "comprises," "consists essentially of," "consists of," and the like as is appropriate.

These and other aspects, advantages, and salient features of this disclosure will become apparent from the following description, the accompanying drawings, and the appended claims.

DETAILED DESCRIPTION

Figure 1:
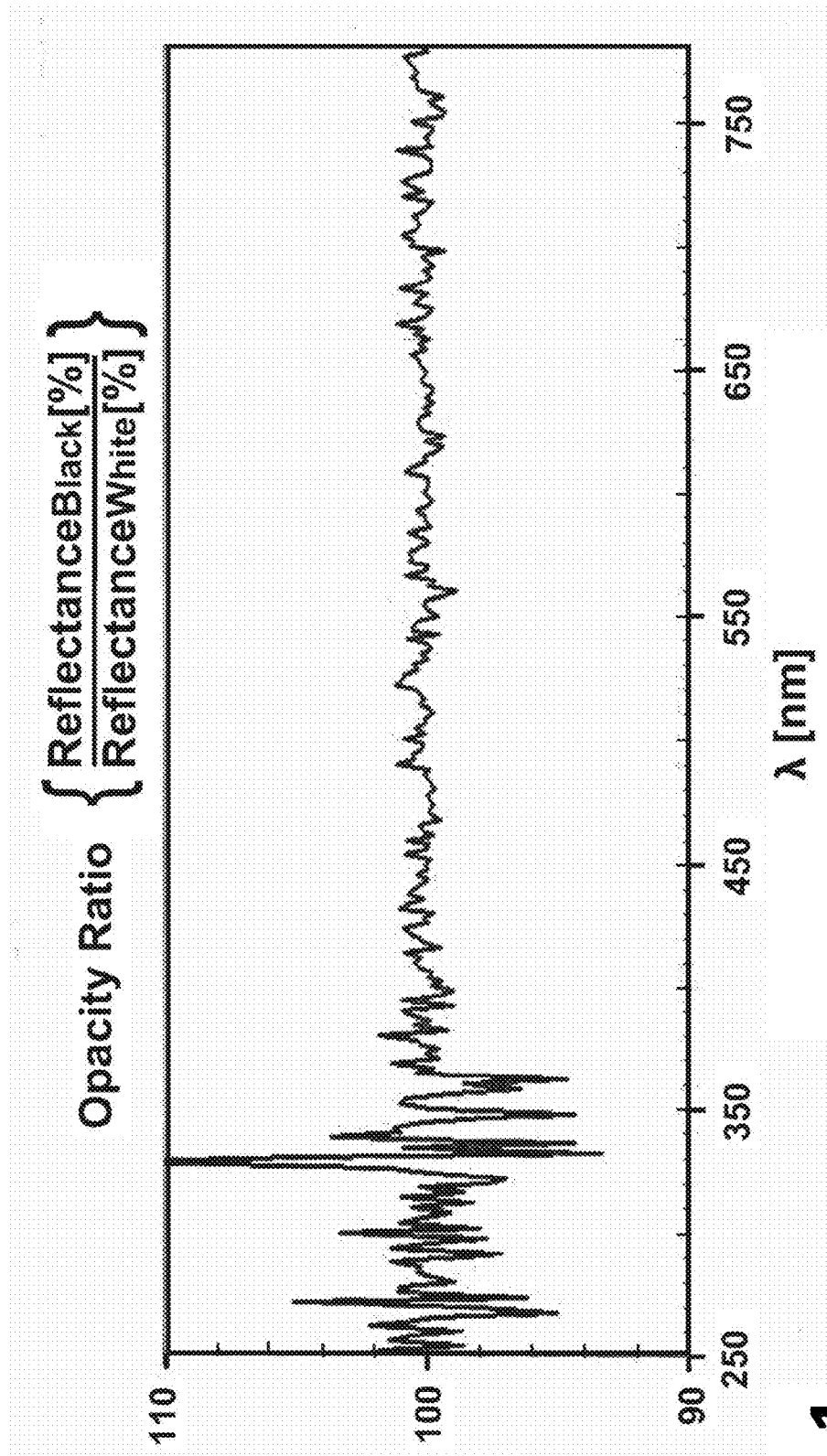
FIG. 1 shows the opacity ratio as a function of wave length (λ) for a β-spodumene glass-ceramic according to aspects and/or embodiments of this disclosure.

In the following description of exemplary aspects and/or embodiments of this disclosure, reference is made to the accompanying drawings that form a part hereof, and in which are shown by way of illustration specific aspects and/or embodiments in which this disclosure may be practiced. While these aspects and/or embodiments are described in sufficient detail to enable those skilled in the art to practice this disclosure, it will nevertheless be understood that no limitation of the scope of this disclosure is thereby intended. Alterations and further modifications of the features illustrated herein, and additional applications of the principles illustrated herein, which would occur to one skilled in the relevant art and having possession of this disclosure, are to be considered within the scope of this disclosure. Specifically, other aspects and/or embodiments may be utilized, logical changes (e.g., without limitation, any one or more of chemical, compositional {e.g., without limitation, any one or more of chemicals, materials, . . . and the like}, electrical, electrochemical, electromechanical, electro-optical, mechanical, optical, physical, physiochemical, . . . and the like) and other changes may be made without departing from the spirit or scope of this disclosure. Accordingly, the following description is not to be taken in a limiting sense and the scope of aspects and/or embodiments of this disclosure are defined by the appended claims. It is also understood that terms such as "top," "bottom," "outward," "inward," . . . and the like are words of convenience and are not to be construed as limiting terms. Also, unless otherwise specified herein, a range of values includes both the upper and lower limits of the range. For example, a range of between about 1-10 mole % includes the values of 1 mole % and 10 mole %.

As noted, various aspects and/or embodiments of this disclosure relate to an article and/or machine or equipment formed from and/or including one or more of white, opaque, β-spodumene glass-ceramics, IXable, white, opaque, β-spodumene glass-ceramics, and/or IX, white, opaque, β-spodumene glass-ceramics of this disclosure. As one example, white, opaque, β-spodumene glass-ceramics, IXable, white, opaque, β-spodumene glass-ceramics, and/or IX, white, opaque, β-spodumene glass-ceramics might be used in a variety of electronic devices or portable computing devices, which might be configured for wireless communication, such as, computers and computer accessories, such as, "mice", keyboards, monitors (e.g., liquid crystal display (LCD), which might be any of cold cathode fluorescent lights (CCFLs-backlit LCD), light emitting diode (LED-backlit LCD) . . . etc, plasma display panel (PDP) . . . and the like), game controllers, tablets, thumb drives, external drives, whiteboards . . . etc.; personal digital assistants (PDAs); portable navigation device (PNDs); portable inventory devices (PIDs); entertainment devices and/or centers, devices and/or center accessories such as, tuners, media players (e.g., record, cassette, disc, solid-state . . . etc.), cable and/or satellite receivers, keyboards, monitors (e.g., liquid crystal display (LCD), which might be any of cold cathode fluorescent lights (CCFLs-backlit LCD), light emitting diode (LED-backlit LCD) . . . etc, plasma display panel (PDP) . . . and the like), game controllers . . . etc.; electronic reader devices or e-readers; mobile or smart phones . . . etc. As alternative examples, white, opaque, β-spodumene glass-ceramics, IXable, white, opaque, β-spodumene glass-ceramics, and/or IX, white, opaque, β-spodumene glass-ceramics might be used in automotive, appliances, and even architectural applications. To that end, it is desirable that crystallizable glasses thereto are formulated to have a sufficiently low softening point and/or a sufficiently low coefficient of thermal expansion so as to be compatible with manipulation into complex shapes.

White, opaque, β-spodumene glass-ceramics having β-spodumene as the predominant crystalline phase according to aspects and/or embodiments of this disclosure, in mole %, include: 62-75 SiO$_2$; 10.5-17 Al$_2$O$_3$; 5-13 Li$_2$O; 0-4 ZnO; 0-8 MgO; 2-5 TiO$_2$; 0-4 B$_2$O$_3$; 0-5 Na$_2$O; 0-4 K$_2$O; 0-2 ZrO$_2$; 0-7 P$_2$O$_5$; 0-0.3 Fe$_2$O$_3$; 0-2 MnOx; and 0.05-0.2 SnO$_2$, while in alternative aspects, in mole %, including: 67-74 SiO$_2$; 11-15 Al$_2$O$_3$; 5.5-9 Li$_2$O; 0.5-2 ZnO; 2-4.5 MgO; 3-4.5 TiO$_2$; 0-2.2 B$_2$O$_3$; 0-1 Na$_2$O; 0-1 K$_2$O; 0-1 ZrO$_2$; 0-4 P$_2$O$_5$; 0-0.1 Fe$_2$O$_3$; 0-1.5 MnOx; and 0.08-0.16 SnO$_2$.

In some aspects, such glass-ceramics exhibit the following compositional criteria:

(1) the ratio of $$\frac{\text{the mole sum total of } [Li_2O + Na_2O + K_2O + MgO + ZnO]}{\text{to the mole sum total of } [Al_2O_3 + B_2O_3]}$$

can be between 0.7 to 1.5 and in some alternative aspects between 0.75 to 1.05 while in other alternative aspects between 0.8 to 1; and (2) the ratio of:

$$\frac{\text{the mole sum total of } [TiO_2 + SnO_2]}{\text{to the mole sum total of } [SiO_2 + B_2O_3]}$$

can be greater than 0.04 and in some alternative aspects greater than 0.05.

In some additional aspects, such glass-ceramics exhibit the following crystal phase assemblage:

(1) β-spodumene solid solutions exhibiting Li$_2$O:Al$_2$O$_3$:SiO$_2$ ratios ranging from 1:1:4.5-1:1:8 or, alternatively, from 1:1:4.5-1:1:7, and comprising at least 70 wt % of the crystalline phase;

(2) at least one Ti-containing crystalline phase comprising:
  a. about 2.5-8 wt % of the crystalline phases of the glass-ceramic,
  b. an acicular morphology exhibiting a length ≥about 50 nm, and
  c. rutile; and optionally, (3) One or more crystalline phases exhibiting a spinel structure and comprising 1-10 wt % of the crystalline phase.

In further aspects, such glass-ceramics exhibit opaqueness and/or an opacity ≥85% for a 0.8 mm thickness over the wavelength range of 400 nm-700 nm.

In still further aspects, when measurement results obtained between about 350 nm-800 nm are presented in CIELAB color space coordinates for a CIE illuminant F02, such glass-ceramics exhibit a level of lightness (L*) ranging between 88 and 97, in some alternative aspects, L* ranging between 90 and 96.5. In Additional aspects and again presenting the results in CIELAB color space coordinates for a CIE illuminant F02, such glass ceramic articles exhibit a* values ranging between −3 and +3 and b* values ranging between −6 and +6; in some alternative aspects, a* values ranging between −2 and +2 and b* values ranging between −5.5 and +5.5; and, in yet other alternative aspects, a* values ranging between −1 and +1 and b* values ranging between −4 and +4.

As noted, the ratio $$\frac{[Li_2O + Na_2O + K_2O + MgO + ZnO]}{[Al_2O_3 + B_2O_3]}$$

can be between 0.7 to 1.5 and in some alternative aspects between 0.75 to 1.05 while in other alternative aspects between 0.8 to 1. Applicants have found that by formulating crystallizable glasses to have prespecified values of this ratio, glass-ceramics made using such crystallizable glasses can be made to have desired characteristics including compositions and/or amounts and/or structure of predominant crystalline phases and minor crystalline phases. For example, the modifier-to-alumina molar ratio can be prescribed so that a glass-ceramics includes one or more of β-spodumene, Ti-containing crystalline phases that include rutile, spinel solid solutions, and residual glass so that each is present at prescribed and desired amount while having prescribed and desired compositions and/or structures and/or distributions. To that end, the modifier-to-alumina molar ratio influences the properties and/or processing characteristics of crystallizable glasses and, in turn, the properties and/or characteristics of glass-ceramics made therefrom. For example, the modifier-to-alumina molar ratio influences crystallizable glass composition's glass transition temperature (Tg), as well as nucleation temperature (Tn) ranges and/or the crystallization temperature (Tc) ranges for of predominant crystalline phases (e.g., β-spodumene) and minor crystalline phases (e.g., Ti-containing crystalline phases, spinel solid solutions, β-quartz . . . etc.) In this manner, crystallizable glasses are formulated so that the value of this ratio allows for practical transforming schedules (e.g., nucleation and crystallization temperatures and/or times) while at the same time allowing for the formation of glass-ceramics characterized by prespecified color coordinates that can be repeatedly and reliably achieved.

As noted, glass-ceramics according to aspects and/or embodiments of this disclosure exhibiting or having "β-spodumene solid solution as the predominant crystalline phase" (alternatively stated "β-spodumene ss as the predominant crystalline phase" or "β-spodumene as the predominant crystalline phase") means that β-spodumene solid solution (alternatively stated "β-spodumene ss" or "β-spodumene") constitutes greater than about 70 percent by weight (wt %) of the all the crystalline phases of a glass-ceramic according to aspects and/or embodiments of this disclosure. Non limiting examples of other possible crystalline phases of glass-ceramics according to aspects and/or embodiments of this disclosure include: β-quartz solid solutions ("β-quartz ss" or "β-quartz"); β-eucryptite solid solutions ("β-eucryptite ss" or "β-eucryptite"); spinel solid solutions ("spinel ss" or "spinel" {such as e.g., gahnite . . . etc.}); Ti containing crystalline phases (such as e.g., rutile, anatase, magnesium titanates {such as e.g., karrooite ($MgTi_2O_5$) . . . etc.}, aluminum titanates {such as e.g., tielite ($Al_2TiO_5$) . . . etc.}, . . . etc.); cordierites (such as e.g., $\{Mg,Fe\}_2Al_3\{Si_5\,AlO_{18}\}$ to $\{Fe,Mg\}_2Al_3\{Si_5AlO_{18}\}$), and the like.

A predominance of β-spodumene solid solution in β-spodumene glass-ceramics according to aspects and/or embodiments of this disclosure can be beneficial when such glass-ceramics are subjected to one or more IX treatments to produce IX glass-ceramics. For example, the structure of β-spodumene can exhibit flexibility without a breakdown of the framework when Li ions are exchanged for a variety of cations (e.g., ions of Na, K, Rb . . . etc.).

According to some aspects and/or embodiments of this disclosure, β-spodumene glass-ceramics can be characterized as being opaque and/or being white. In such cases, Applicants have found that to achieve desired opacity and/or desired whiteness levels such β-spodumene glass-ceramics include one or more Ti-containing crystalline phases, which include rutile, as a minor crystalline phase. Example of such one or more Ti-containing crystalline phases include any of rutile ($TiO_2$) and, optionally, can include one or more of anatase ($TiO_2$), karrooite ($MgTi_2O_5$), tielite ($Al_2TiO_5$) . . . etc., and mixtures thereof. When it is desirable to achieve a desired opacity and desired whiteness levels, Applicants have found that to achieve a desired degree of opacity and whiteness such β-spodumene glass-ceramics include one or more Ti-containing crystalline phases, which include rutile, can be acicular crystals exhibiting in some aspects a length ≥50 nm, in other aspects a length ≥110 nm, and in still other aspects a length ≥1 µm, while in some instances up to 2 µm.

Spinels are crystalline oxides having the generic formula $AB_2O_4$ and the basic spinel structure that is cubic. The prototype spinel structure is that of magnesium aluminate ($MgAl_2O_4$). In the basic spinel structure, O-atoms fill the sites of an face centered cubic (FCC) array; A-atoms occupy some of tetrahedral sites (A-sites) in the FCC structure; and B-atoms occupy octahedral sites (B-sites) in the FCC structure. In the normal spinels, the A and B atoms are different, A is a +2 ion and B is a +3 ion. In disordered spinels the +2 ions and +3 ions are randomly distributed over the A-sites and B-sites. In inverse spinels the A-sites are occupied by +3 ions with the consequence that the B-sites have an equal mixture of +2 ions and +3 ions and the A and B atoms can be the same. In some instances some A-sites can be occupied by +2 ions, +3 ions, and/or +4 ions while in the same or other instances B-sites can be occupied by +2 ions, +3 ions, and/or +4 ions. Some examples of A-atoms include zinc, nickel, manganese, magnesium, iron, copper, cobalt . . . etc. Also some examples of B-atoms include aluminum, antimony, chromium, iron, manganese, titanium, vanadium . . . etc. A wide range of solid solutions are common in spinels and can be represented by the generic formula $(A_x^1A_{1-x}^2)[B_y^1B_{2-y}^2]O_4$. For example, complete solid solution is obtained between $ZnAl_2O_4$ and $MgAl_2O_4$, which can represented by the formula $(Zn_x^1Mg_{1-x}^2)Al_2O_4$. According to some aspects and/or embodiments of this disclosure, β-spodumene glass-ceramics include one or more crystalline phases exhibiting a spinel structure, which in aspects have compositions close to that of gahnite, $ZnAl_2O_4$. Also it has been found that as the amounts of ZnO or ZnO and $Al_2O_3$ are increased, such β-spodumene glass-ceramics can have increased amounts of gahnite. The refractive index (n) of gahnite can range between 1.79-1.82, which can be higher than that of β-spodumene (n=between 1.53-1.57) but significantly less than that of rutile (n=between 2.61-2.89). Also, in contrast to β-spodumene and rutile that are tetragonal, being cubic spinels can exhibit no birefringence. Therefore, Applicants believe that spinels in general and Zn-containing spinels in particular would has less of influence on color of β-spodumene glass-ceramics than would rutile.

In aspects of embodiments of this disclosure when β-spodumene glass-ceramics include Ti-containing crystalline phases comprising rutile, it can range between 2.5 wt % to 6 wt % of the crystalline phases. Applicants have found that by maintaining rutile as at least 2.5 wt % of the crystalline phases minimum desired opacity levels can be ensured while by maintaining rutile as 6 wt % or less of the crystalline phases desired opacity levels can be maintained while at the same time desired white levels can be ensured. Stated differently, the $TiO_2$ content of β-spodumene glass-ceramics can range between 2-5 mole % and by maintaining at least 2 mole % minimum desired opacity levels can be ensured while by maintaining 5 mole % or less desired opacity levels can be maintained while at the same time desired white levels can be ensured.

For comparison, the refraction index (n) in descending order for several materials follows: rutile (n=between 2.61-2.89); anatase (n=between 2.48-2.56); diamond (n=between 2.41-2.43); gahnite (n=between 1.79-1.82); sapphire (n=between 1.75-1.78); cordierite (n=between 1.52-1.58); β-spodumene (n=between 1.53-1.57); and residual glass (n=between 1.45-1.49). Also for comparison, the birefringence (Δn) in descending order for the some of the same materials follows: rutile (Δn=between 0.25-0.29); anatase (Δn=0.073); sapphire (Δn=0.008); cordierite (Δn=between 0.005-0.017); diamond (Δn=j); and gahnite (Δn=0). Based on the above data, it can be seen that some of the Ti-containing crystalline phases, and rutile in particular, are among the materials exhibiting some of the highest refractive indices. In addition, another it can be seen that the some of the Ti-containing crystalline phases, and rutile in particular, their relatively high birefringence (Δn), a result of the anisotropic character of their tetragonal crystal structure. As a difference in either refractive index or birefringence increases among a predominant crystalline phase (e.g., β-spodumene {n=between 1.53-1.57}) and/or any residual glass (n=between 1.45-1.49) and any minor crystalline phases of glass-ceramics scattering of visible wavelengths can increase in turn increasing opacity. A difference in each characteristic alone can be beneficial while a difference in both even more be even more so. Given the differences in both among some of the Ti-containing crystalline phases, and rutile in particular, and the base phase(s) (β-spodumene and any residual glass), the β-spodumene glass-ceramics of the present disclosure exhibit desirable level scattering that can be relatively high and, thus the requisite and desired opacity that likewise can be high.

$Al_2O_3$ contributes to the β-spodumene glass-ceramics of the present disclosure exhibiting β-spodumene as the predominant crystalline phase. As such, a minimum of 10.5 mole % $Al_2O_3$ is desired. Above 17 mole % $Al_2O_3$ is undesirable as the resultant mullite liquidus makes it difficult to melt and form crystallizable glasses.

Including $Na_2O$ and $K_2O$ can reduce the melting temperature of the crystallizable glasses and/or enable shorter crystallization cycles.

Crystallizable glasses and/or β-spodumene glass-ceramics of the present disclosure contain 0-4 mole % $B_2O_3$. Crystallizable glasses of present disclosure typically can be melted at a temperature below 1600° C., in certain aspect and/or embodiments below about 1580° C. while in certain other aspect and/or embodiments below about 1550° C., making it possible to melt in a relatively small commercial glass tank. The inclusion of $B_2O_3$ is conducive to the low melting temperature MgO and ZnO can act as fluxes for crystallizable glasses. As such, a minimum mole % sum [MgO+ZnO] of 2 mole % is desired to obtain a glass melting temperature below 1600° C. Ions of Mg and, to a lesser extent, ions of Zn can participate in the β-spodumene of the β-spodumene glass-ceramics.

Maintaining $Li_2O$ between 5-13 mole % in crystallizable glasses encourages the formation of β-spodumene solid solution crystalline phases. Also, $Li_2O$ acts as a flux to decrease the melting point of the crystallizable glasses. As such, a minimum of 5 mole % $Li_2O$ is desired in order to obtain the desired β-spodumene phase. Above 13 mole % $Li_2O$ can be undesirable as unwelcome phases, such as, lithium silicates . . . etc., might result during the formation of glass-ceramics.

An appropriate types and amount of one or more nucleation agents is included in crystallizable glasses to facilitate nucleation and/or growth of at least β-spodumene as the predominant crystalline phase and any desired one or more minor crystalline phases during the nucleation and/or crystallization heat treatments. Among appropriate types of one or more nucleation agents are $TiO_2$, $ZrO_2$ . . . etc. while among appropriate amounts are $TiO_2$: up to 6 mole %; and/or $ZrO_2$: up to 2 mole % . . . etc. Small amount of $SnO_2$ appear to enter the rutile phase in solid solution and, as such, might contribute to nucleation. In aspects and/or embodiments, applicants have found that an inclusion of $TiO_2$ as a nucleation agent is desirable when the formation of one or more Ti-containing phases is desired to achieve a prescribed degree of opacity and whiteness levels. In other aspects and/or embodiments, an inclusion of $ZrO_2$ as a nucleation agent can increase nucleation efficiency. Thus, types and amount of one or more nucleation agents is carefully prescribed. It is noted that in certain aspect and/or embodiments relating to β-spodumene glass-ceramics (optionally exhibiting β-quartz solid solution), a minimum mole % sum [$TiO_2$+$SnO_2$] in excess of 2.5 mole % is desired as an ingredient of crystallizable glasses. In other words, effective amounts of this mole % sum [$TiO_2$+$SnO_2$] are formulated as an ingredient of crystallizable glasses so that nucleation in an effective manner occurs and growth is achieved to a preselected and appropriate crystal phase assemblage. It is noted that above 6 mole % $TiO_2$ is undesirable as the resultant high rutile liquidus has the potential of increasing difficulties during shape forming of crystallizable glasses. Also, it is noted that an inclusion of $SnO_2$, in addition to its possible minor contribution to nucleation, can partially function as a fining agent during a manufacture of crystallizable glasses to contribute to their quality and integrity.

Maintaining the ratio:

$$\frac{[TiO_2 + SnO_2]}{[SiO_2 + B_2O_3]}$$

in some aspects greater than 0.04 and, in some alternative aspects, greater than 0.05 can contribute to achieving preselected and appropriate crystal phase assemblages that, in turn, contributes to achieving prescribed degrees of opacity and/or whiteness levels.

Also in β-spodumene glass-ceramics and/or their crystallizable glasses according to aspect and/or embodiments, applicant have found that β-spodumene crystalline phases exhibiting a $Li_2O:Al_2O_3:nSiO_2$ ratio between 1:1:4.5-1:1:8 to be desirable. As such, a minimum ratio of 1:1:4.5 is desired to avoid the formation of excessive levels of the unstable residual glass in the resultant β-spodumene glass-ceramics. Above a ratio of 1:1:8 is undesirable as issues with that meltability of crystallizable glasses can arise.

Other properties that can be exhibited by β-spodumene glass-ceramics according to aspects and/or embodiments of this disclosure include one or more of:

(1) radio and microwave frequency transparency, as defined by a loss tangent of less than 0.03 and at a frequency range of between 15 MHz to 3.0 GHz;

(2) a fracture toughness greater than 1 $MPa \cdot m^{1/2}$;

(3) a Modulus of Rupture (MOR) greater than 20,000 psi;

(4) a Knoop hardness of at least 400 $kg/mm^2$;

(5) a thermal conductivity of less than 4 W/m° C.; and (6) a porosity of less than 0.1 vol %.

In aspects and/or embodiments relating to articles in general and electronic device housings or enclosures in particular (each partially or completely comprised of β-spodumene glass-ceramics), such articles and/or β-spodumene glass-ceramics exhibit radio and microwave frequency transparency, as defined in some aspects by a loss tangent of less than 0.02; in alternative aspects of less than 0.01; and in still further aspects of less 0.005, the loss tangent determined over a frequency ranging from 15 MHz to 3.0 GHz at about 25° C. This radio and microwave frequency transparency feature can be especially beneficial for wireless hand held devices that include antennas internal to the enclosure. This radio and microwave transparency allows the wireless signals to pass through the housings or enclosures and in some cases enhances these transmissions. Additional benefits can be realized when such articles and/or β-spodumene glass-ceramics exhibit a dielectric constant determined over a frequency ranging from 15 MHz to 3.0 GHz at about 25° C. of less than about 10; alternatively, less than about 8; or then again, less than about 7 in combination with the above values of loss tangent.

In still further aspects and/or embodiments of this disclosure relating to β-spodumene glass-ceramics that have been chemically strengthened, such IX, β-spodumene glass-ceramics exhibit a fracture toughness of greater than 0.8 $MPa \cdot m^{1/2}$; alternatively, greater than 0.85 $MPa \cdot m^{1/2}$; or then again, greater than 1 $MPa \cdot m^{1/2}$. Independent of or in combination with the stated fracture toughnesses, such IX, β-spodumene glass-ceramics exhibit a MOR of greater than 40,000 psi or, alternatively, greater than greater than 50,000 psi.

Other aspects and/or embodiments of this disclosure relate to methods for forming crystallizable glasses formulated to be crystallizable to glass-ceramics and methods for forming glass-ceramics having a β-spodumene as the predominant crystalline phase. In aspects, some methods included melting a mixture of raw materials formulated to produce upon melting crystallizable glasses, in mole %, including: 62-75 $SiO_2$; 10.5-17 $Al_2O_3$; 5-13 $Li_2O$; 0-4 ZnO; 0-8 MgO; 2-5 $TiO_2$; 0-4 $B_2O_3$; 0-5 $Na_2O$; 0-4 $K_2O$; 0-2 $ZrO_2$; 0-7 $P_2O_5$; 0-0.3 $Fe_2O_3$; 0-2 MnOx; and 0.05-0.2 $SnO_2$, while in alternative aspects, in mole %, including: 67-74 $SiO_2$; 11-15 $Al_2O_3$; 5.5-9 $Li_2O$; 0.5-2 ZnO; 2-4.5 MgO; 3-4.5 $TiO_2$; 0-2.2 $B_2O_3$; 0-1 $Na_2O$; 0-1 $K_2O$; 0-1 $ZrO_2$; 0-4 $P_2O_5$; 0-0.1 $Fe_2O_3$; 0-1.5 MnOx; and 0.08-0.16 $SnO_2$.

In additional aspects, such mixture of raw materials is formulated to produce upon melting crystallizable glasses exhibiting the following compositional criteria:

(1) the ratio of $$\frac{\text{the mole sum total of } [Li_2O + Na_2O + K_2O + MgO + ZnO]}{\text{to the mole sum total of } [Al_2O_3 + B_2O_3]}$$

might be between 0.7 to 1.5 and in some alternative aspects between 0.75 to 1.05 while in other alternative aspects between 0.8 to 1; and (2) the ratio of:

$$\frac{\text{the mole sum total of } [TiO_2 + SnO_2]}{\text{to the mole sum total of } [SiO_2 + B_2O_3]}$$

can be greater than 0.04 and in some alternative aspects greater than 0.05.

In still other aspects, such mixture of raw materials is formulated to produce the above crystallizable glasses upon fining and homogenization molten glass compositions at a temperature below about 1600° C. Still yet other aspects included forming molten crystallizable glasses into a glass article.

In further aspects, some other methods included methods for forming glass-ceramics having a β-spodumene as the predominant crystalline phase by transforming crystallizable glasses. Such other methods including (i) heating a glass article comprising and/or a crystallizable glass formulated to be crystallizable to a glass-ceramics having a β-spodumene as the predominant crystalline phase at a rate of 1-10° C./min to a nucleation temperature (Tn) ranging between 700 and 810° C.; (ii) maintaining the glass article comprising and/or the crystallizable glass at the nucleation temperature for a time ranging between ¼ h to 2 h to produce a glass article comprising and/or a nucleated crystallizable glass; (iii) heating the glass article comprising and/or a nucleated crystallizable glass at a rate of 1-10° C./min to a crystallization temperature (Tc) ranging between 850° C. and 1250° C.; (iv) maintaining the glass article comprising and/or the nucleated crystallizable glass at the crystallization temperature for a time ranging between about ¼ h to 4 h to produce an article comprising and/or a glass-ceramic having a β-spodumene as the predominant crystalline phase; and (v) cooling the article comprising and/or β-spodumene glass-ceramic to room temperature.

Temperature-temporal profile of steps (iii) and (iv), in addition to a crystallizable glasses, are judiciously prescribed so as to produce the desired β-spodumene solid solution as a predominant crystalline phase and one or more Ti-containing crystalline phases, which include rutile, as one or more minor crystalline phases; desired proportions of the predominate crystalline phase and/or minor crystalline phase(s) and residual glass; desired crystal phase assemblages of the predominate crystalline phase and/or minor crystalline phase(s) and residual glass; desired grain sizes or grain size distributions among the predominate crystalline phase and/or minor crystalline phase(s); and, hence the final integrity, quality, color, and/or opacity, of resultant glass-ceramics and/or glass-ceramic articles according to aspects and/or embodiments of this disclosure.

Regarding raw material selection it is recommended that low iron content sand is used as the $SiO_2$ source. Prior acid treatment may be necessary to reduce the iron level of the sand and other batch materials. It is important to make sure that the treatment of the batch materials per se does not introduce iron oxides. Anhydrous boric acid may be used as the source of $B_2O_3$. Spodumene, fine alumina, and Al-metaphosphate may be used as the starting materials. One skilled in the art can calculate the amount of batch materials used according to the projected final composition of the glass-ceramic. As mentioned above, a fining agent that has been found to be beneficial is $SnO_2$ in an amount between about 0.05-0.15 mole %.

The mixed batch materials are then charged into a glass tank and melted according to conventional glass melting process. One skilled in the glass melting art can adjust the composition of the batch within the above described compositional range to fine tune the melting ease of the glass in order to accommodate the operating capacity and temperature of the glass melting tank. The molten glass can be homogenized and fined using conventional methods. Whilst some glasses having a melting temperature over 1600° C. can crystallize to form β-quartz and/or β-spodumene solid solution glass-ceramic, such high temperature melting usually has to be carried out in expensive melting tanks with special design. In addition, the liquidus behavior of such high melting temperature glass usually requires higher temperature pressing and molding.

The homogenized, fined and thermally uniform molten glass is then formed into desired shapes. Various shaping may be used, such as casting, molding, pressing, rolling, floating, and the like. Generally, the glass should be formed at a viscosity lower than the liquidus viscosity (hence a temperature higher than the liquidus temperature). Take pressing for example. The glass is first delivered to high temperature molds and formed into glass articles with desired shape, surface texture and surface roughness by using a plunger. To obtain low surface roughness and a precise surface contour, precision plungers are required to press the glass gobs filled in the molds. It is also required that the plungers will not introduce IR absorbing oxides or other defects onto the surface of the glass article should high IR transmission is required. The moldings are then removed from the molds and transferred to a glass annealer to remove enough stress in the moldings for further processing where necessary and desirable. Thereafter, the cooled glass moldings are inspected, analyzed of chemical and physical properties for quality control purpose. Surface roughness and contour may be tested for compliance with product specification.

To produce the glass-ceramic article of the present disclosure, the thus prepared glass articles are placed into a crystallization kiln to undergo the crystallization process. The temperature-temporal profile of the kiln is desirably program-controlled and optimized to ensure that the glass moldings and other glass articles, such as glass plates and the like, are formed into glass-ceramic articles having β-spodumene as the predominant crystalline phase. As described above, the glass composition and the thermal history during the crystallization process determine the final crystalline phases, their assemblage and crystallite sizes in the final product. Generally, the glass articles are first heated to a nucleation temperature (Tn) range where crystal nuclei start to form. Subsequently, they are heated to an even higher maximum crystallization temperature Tc to obtain β-spodumene crystallization. It is often desired to keep the articles at Tc for a period of time so that crystallization reaches a desired extent. In order to obtain the glass-ceramic articles of the present disclosure, the nucleation temperature Tn is between 700-810° C., and the maximum crystallization temperature Tc is between 850° C.-1250° C. After crystallization, the articles are allowed to exit the crystallization kiln and are cooled to room temperature. One skilled in the art can adjust Tn, Tc and the temperature-temporal profile of the crystallization cycle to accommodate the different glass compositions within the above-described range. The glass-ceramic article of the present disclosure can advantageously exhibit an opaque white coloring.

The glass-ceramic article of the present disclosure may be further processed before its final intended use. One such post-processing includes IX treatment of the glass-ceramic to form an IX glass-ceramic article having at least a portion of at least one surface subjected to an IX process, such that the IX portion of the least one surface exhibits a compressive layer having a depth of layer (DOL) greater than or equal to 2% of the overall article thickness while exhibiting a compressive stress ($\sigma_s$) in the surface of at least 300 MPa. Any IX process known to those in the art might be suitable as long as the above DOL and compressive stress ($\sigma_s$) are achievable.

In a more particular embodiment the housing or enclosure exhibits an overall thickness of 2 mm and compressive layer exhibiting a DOL of 40 μm with that compressive layer exhibiting a compressive stress ($\sigma_s$) of at least 500 MPa. Again any IX process which achieves these features is suitable.

It is noted that in addition to single step IX processes, multiple IX procedures might be utilized to create a designed IX profile for enhanced performance. That is, a stress profile created to a selected depth by using IX baths formulated with differing concentration of ions or by using multiple IX baths formulated using different ion species having different ionic radii.

As used herein, the term "ion exchanged" is understood to mean treating the heated β-spodumene glass-ceramic with a heated solution containing ions having a different ionic radius than ions that are present in the glass-ceramic surface and/or bulk, thus replacing those ions with smaller ions with the larger ions or vice versa depending on the ion exchange ("IX") temperature conditions. Potassium (K) ions, for example, could either replace, or be replaced by, sodium (Na) ions in the glass-ceramic, again depending upon the IX temperature conditions. Alternatively, other alkali metal ions having larger atomic radii, such as (Rb) rubidium or cesium (Cs) could replace smaller alkali metal ions in the glass-ceramic. Similarly, other alkali metal salts such as, but not limited to, sulfates, halides, and the like may be used in the ion exchange ("IX") process.

In the instant method, it is contemplated that both types of IX can take place; i.e., larger for smaller ions are replaced and/or smaller for larger ions are replaced. In one some aspects and/or embodiments, the method involves IX (particularly lithium-for-sodium ion exchange) the β-spodumene glass-ceramic by placing it in an $NaNO_3$ bath at temperatures between 310-430° C. for times up to 10 h. In other aspects and/or embodiments, the IX can be accomplished utilizing mixed potassium/sodium baths at similar temperatures and times; e.g., an 80/20 $KNO_3/NaNO_3$ bath or alternatively a 60/40 $KNO_3/NaNO_3$ at comparable temperatures. In still other aspects and/or embodiments, a two-step IX process is contemplated wherein the first step is accomplished in a Li-containing salt bath; e.g. the molten salt bath can be a high temperature sulfate salt bath composed of $Li_2SO_4$ as a major ingredient, but diluted with $Na_2SO_4$, $K_2SO_4$ or $Cs_2SO_4$ in sufficient concentration to create a molten bath. This IX step functions to replace the larger sodium ions in the β-spodumene glass-ceramic with the smaller lithium ions which are found in the Li-containing salt bath. The second IX step functions to exchange Na into the β-spodumene glass-ceramic and can be accomplished as above by a $NaNO_3$ bath at temperatures between 310° C. and 430° C.

Characterization of Crystallizable Glasses, Glass-Ceramics, IXable Glass-Ceramics, and/or IX Glass-Ceramics CIELAB color space coordinates (e.g., CIE L*; CIE a*; and CIE b*; or CIE L*, a*, and b*; or L*, a*, and b*) for describing the color of β-spodumene glass-ceramics; IXable, β-spodumene glass-ceramic; and/or IX, β-spodumene glass-ceramics according to aspects and/or embodiments of this disclosure were determined by methods known to those in the art from total reflectance—specular included—measurements, such as, those described by F. W. Billmeyer, Jr., "Current American Practice in Color Measurement," Applied Optics, Vol. 8, No. 4, pp. 737-750 (April 1969), which are incorporated by reference herein, at http://www.xphotonics.com/tech/Color %20Measurement/Current %20American %20Practice %20 in %20Color %20Measurement.pdf. Namely, total reflectance—specular included—measurements were made of surfaces prepared to an optical polish using sample disks measuring about 33 mmØ×8 mm thick. Equipment and supplies for making such total reflectance—specular included—measurements and translating results to obtain L*; a*; and b* color space coordinates included:

an ultraviolet-visible-near infrared (UV-VIS-NIR) spectrophotometer equipped with integrating sphere such as the commercially available Varian Cary 5G or PerkinElmer Lambda 950 UV-VIS-NIR spectrophotometers (see e.g., LAMBDA™ UV/Vis/NIR and UV/Vis spectrophotometers—950, 850, and 650; Applications and Use of Integrating Spheres; and High Performance Lambda Spectroscopy Accessories brochures, which are incorporated by reference herein, at http://www.perkinelmer.com.cn/CMSResources/Images/46-131732BRO_Lambda950850650Americas.pdf; http://www.perkinelmer.com/CMSResources/Images/44-74191APP_LAMBDA650IntegratingSpheres.pdf; and http://www.labsphere.com/uploads/LambdaSpectroscopyBrochure.pdf, respectively) appropriately equipped and configured so as to be enabled for total reflectance—specular included—measurements in the wavelength range 250-3300 nm (e.g., ultraviolet (UV: 300-400 nm), visible (Vis: 400-700 nm), and infrared (IR: 700-2500 nm); and an analytical software (UV/VIS/NIR application pack of the GRAMS spectroscopy software suite commercially available from Thermo Scientific West Palm Beach, Fla., US; see e.g., GRAMS-UG1009 brochure, which is incorporated by reference herein, at https://www.thermo.com/eThermo/CMA/PDFs/Product/productPDF_24179.pdf) for color measurements coupled to a UV-VIS-NIR spectrophotometer that translated measurement results to the CIELAB color space coordinates (L*; a*; and b*) based on F02 illuminant and a 10-degree standard observer.

Quantitative Measurement of Translucency or Opacity of crystallizable glasses, glass-ceramics, IXable glass-ceramics, and/or IX glass-ceramics according to aspects and/or embodiments of this disclosure can be by methods known to those in the art, such as, those described by E. El-Meliegy et al., "Glasses and Glass Ceramics for Medical Applications," Springer, New York, N.Y., US 2012 at pp. 156-157 (9.6.1 Quantitative Measurement of Translucency or Opacity), which is incorporated by reference herein.

Viscosity of crystallizable glasses according to aspects and/or embodiments of this disclosure can be by methods known to those in the art, such as, those described in ASTM C965-96 (and its progeny, all herein incorporated by reference) "Standard Practice for Measuring Viscosity of Glass Above the Softening Point;" ASTM C1351M-96 (and its progeny, all herein incorporated by reference) "Standard Test Method for Measurement of Viscosity of Glass Between 10E4 Pa·s and 10E8 Pa·s by Viscous Compression of a Solid Right Cylinder;" and ASTM C1350M-96 (and its progeny, all herein incorporated by reference) "Standard Practice for Measuring Viscosity of Glass Between Softening Point and Annealing Range (Approximately 10E8 Pa·s to Approximately 10E13 Pa·s)," ASTM International, Conshohocken, Pa., US.

Annealing point and strain point of crystallizable glasses according to aspects and/or embodiments of this disclosure can be by methods known to those in the art, such as, those described in ASTM C598 (and its progeny, all herein incorporated by reference) "Standard Test Method for Annealing Point and Strain Point of Glass by Beam Bending," ASTM International, Conshohocken, Pa., US.

The dielectric parameters (e.g., loss tangent, dielectric constant . . . etc.) the crystallizable glasses, glass-ceramics, IXable glass-ceramics, and/or IX glass-ceramics according to aspects and/or embodiments of this disclosure were characterized at room temperature by methods known to those in the art, such as, those done with a open-ended coaxial probe similar to that outlined in J. Baker-Jarvis, et al., "High-Frequency Dielectric Measurements," IEEE Instrum. Meas. Mag., pp. 24-31, April 2010; J. Baker-Jarvis et al., "Analysis of an Open-Ended Coaxial Probe," IEEE Trans. Instrum. Meas., vol. 43. no. 5, pp. 711-718 (October 1994); J. Baker-Jarvis et al. "Transmission/Reflection and Short-Circuit Line Methods for Measuring Permittivity and Permeability," Natl. Inst. Stand. Technol. Tech. Note 1355-R, 236 pages (December 1993); and J. Baker-Jarvis et al. "Dielectric and Conductor-Loss Characterization and Measurements on Electronic Packaging Materials," Natl. Inst. Stand. Technol. Tech. Note 1520, 156 pages (July 2001), which are incorporated by reference herein, at http://whites.sdsmtedu/classes/ee692gwmm/notes/Baker-Jarvis_IMM_2010.pdf; http://www.eeel.nist.gov/advanced_materials_publications/Baker-Jarvis %201M %2094.pdf; http://www.eeel.nist.gov/advanced_materials_publications/Baker-Jarvis %20TN %201355-R.pdf and http://whites.sdsmtedu/classes/ee692gwmm/additional/NIST_Tech_Note_1520.pdf, respectively. Those in the art will appreciate that in the laboratory, dielectric parameters can be measured by different methods employing various sample sizes and shapes (see, for example, J. Baker-Jarvis, et al., "High-Frequency Dielectric Measurements," IEEE Instrum. Meas. Mag., pp. 24-31, April 2010; Agilent Application Note: "Basics of Measuring the Dielectric Properties of Materials," Brochure No: 5989-2589EN, Agilent Technologies, Inc., Apr. 28, 2005 (at http://whites.sdsmt.edu/classes/ee692gwmm/additional/Agilent_Basics_dielectric_properties. pdf); H. E. Bussey, "Measurement of RF Properties of Materials. A Survey", Proc. IEEE, vol. 55, pp. 1046-1053, 1967 (at http://ieeexplore.ieee.org/xpl/login.jsp?reload=true&tp=&arnumber=1447649&url=http %3A %2F %2F); J. Baker-Jarvis et al., "Measuring the Permittivity and Permeability of Lossy Materials: Solids, Liquids, Metals, Building Materials, and Negative-index Materials", Natl. Inst. Stand. Technol. Tech. Note 1536, 2004 (at http://www.eeel.nist.gov/advanced_materials_publications/Baker-Jarvis %20TN1536.pdf), which are incorporated by reference herein. The measurement technique depends on the frequency of interest. At frequencies up to several MHz a capacitive technique is typically employed. The material is placed in between the plates of a capacitor, and from the measurements of capacitance, the dielectric constant can be calculated. The capacitance model works well if the wavelength is much longer than the conductor separation.

Identity of the crystalline phases of crystal phase assemblages and/or crystal sizes of a crystalline phase for crystallizable glasses, glass-ceramics, IXable glass-ceramics, and/or IX glass-ceramics according to aspects and/or embodiments of this disclosure were determined by X-ray diffraction (XRD) analysis techniques known to those in the art, using such commercially available equipment as the model as a PW1830 (Cu Kα radiation) diffractometer manufactured by Philips, Netherlands. Spectra were typically acquired for 2θ from 5 to 80 degrees.

Elemental profiles measured for characterizing surfaces of crystallizable glasses, glass-ceramics, IXable glass-ceramics, and/or IX glass-ceramics according to aspects and/or embodiments of this disclosure were determined by analytical techniques know to those in the art, such as, electron microprobe (EMP); x-ray photoluminescence spectroscopy (XPS); secondary ion mass spectroscopy (SIMS) . . . etc.

Compressive stress ($\sigma_s$) in a surface layer, average surface compression (CSavg), and depth of layer (DOL) of IX materials that are transparent can be conveniently measured using conventional optical techniques and instrumentation such as commercially available surface stress meter models FSM-30, FSM-60, FSM-6000LE, FSM-7000H . . . etc. available from Luceo Co., Ltd. and/or Orihara Industrial Co., Ltd., both in Tokyo, Japan (see e.g., FSM-30 Surface Stress Meter Brochure, Cat no. FS-0013E at http://www.orihara-ss.co.jp/catalog/fsm/fsm-30-Ecat.pdf; FSM-60 Surface Stress Meter Brochure, Cat no. FS-0013E at http://www.luceo.co.jp/english/pdf/FSM-60LE %20Ecat.pdf; FSM-6000LE Surface Stress Meter Brochure, Revision 2009.04 at http://www.luceo.co.jp/english/pdf/FSM-6000LE %20Ecat.pdf; FSM-7000H Surface Stress Meter Brochure, Cat no. FS-0024 2009.08 at http://www.luceo.co.jp/catalog/catalog-pdf/FSM-7000H_cat.pdf; T. Kishii, "Surface Stress Meters Utilising the Optical Waveguide Effect of Chemically Tempered Glasses," Optics & Lasers in Engineering 4 (1983) pp. 25-38 at http://www.orihara-ss.co.jp/data/literature01/A034.pdf; and K. Kobayashi et al., "Chemical Strengthening of Glass and Industrial Application," 昭和52年 (1977) [52 (1977)], pp. 109-112 at http://www.orihara-ss.co.jp/data/literature01/A001.pdf, all of which are incorporated by reference herein).

Figure 10:
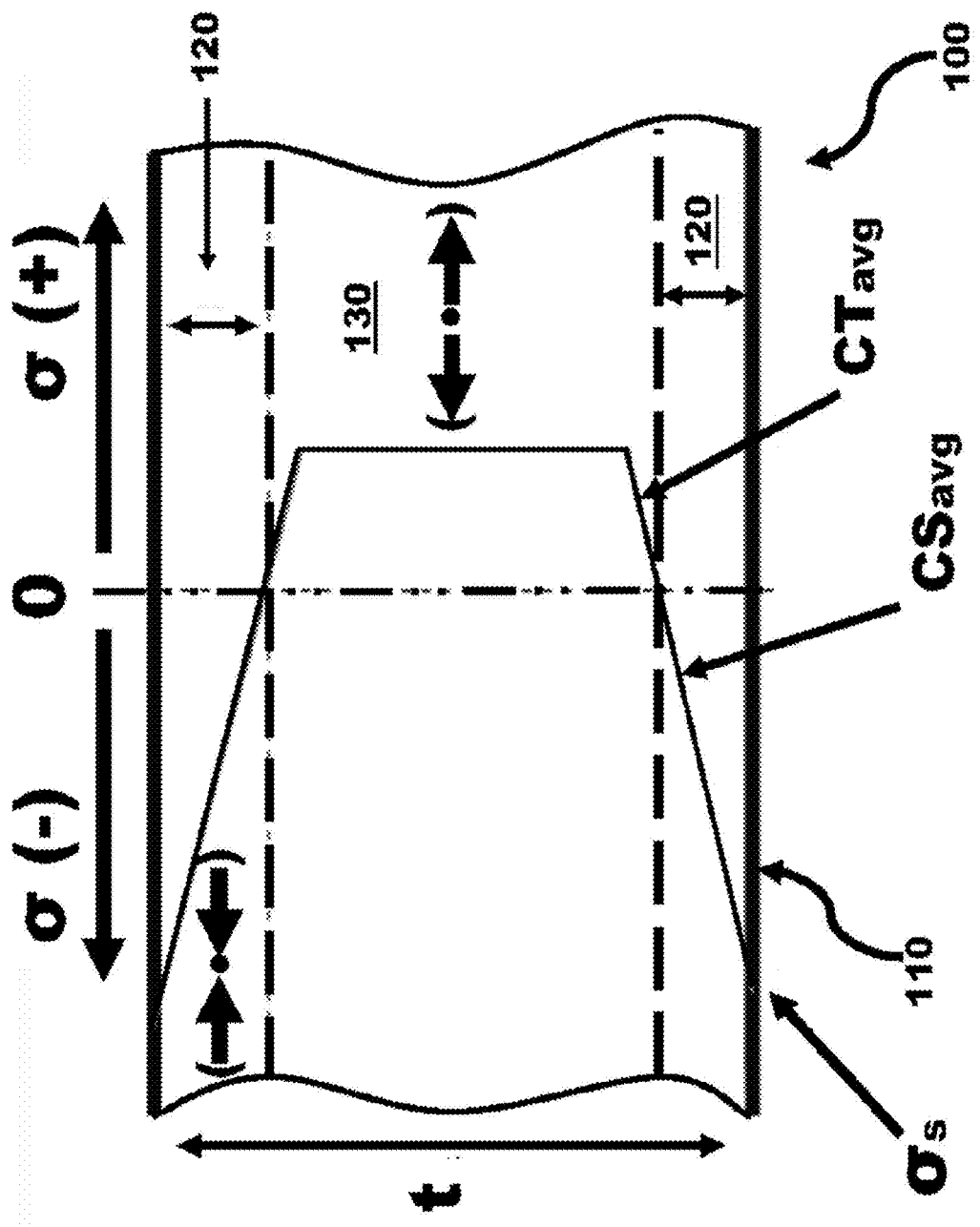
FIG. 10 shows a schematic illustration of a cross section of an IX, β-spodumene glass-ceramic and associated characterizing parameters: compressive stress ($σ_s$) at the IX, β-spodumene glass-ceramic's surface; average surface compression (CSavg); average central tension (CTavg); sample thickness (t); and depth of layer (DOL, which is the perpendicular distance from the surface of the sample to the location within the sample at which the stresses changes sign {i.e., zero} resulting from surface compression and central tension) that can be determined from the sodium (Na) and/or potassium (K) concentration profiles such as those of FIGS. 5 and 6.
Figure 11:
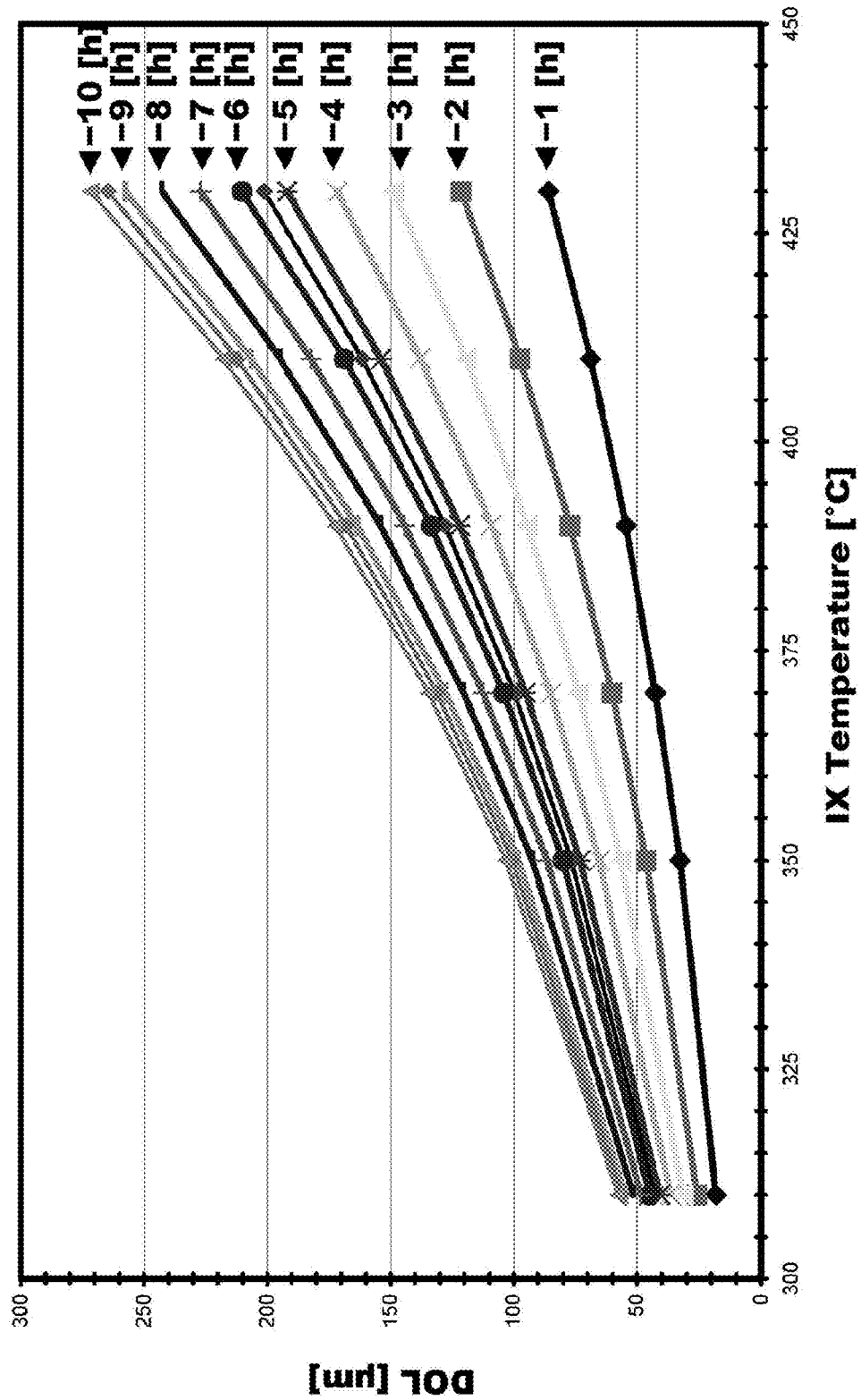
FIG. 11 shows depth of layer (DOL) of IX, β-spodumene glass-ceramics as a function of IX temperature (i.e., the x axis) and IX time (i.e., the family of curves with 1 h being the bottom most and 10 h being the upper most) formed by treating β-spodumene glass-ceramics in NaNO$_3$ IX baths at temperatures from 310° C. to 430° C. for 1 h to 10 h according to aspects and/or embodiments of this disclosure.

Because of the opacity of the β-spodumene glass-ceramics; IXable, β-spodumene glass-ceramics; and/or IX, β-spodumene glass-ceramics of this disclosure, the techniques for measuring CSavg using surface stress meters as discussed above are sometimes not available currently but could be in the future. Accordingly, CSavg can be obtained by selectively etching samples of an IX, β-spodumene glass-ceramic such that a curvature is induced in the sample. The extent of the induced curvature expressed by the etched sample relates to the compressive stress ($\sigma_s$). By successively selectively etching a sample, measuring induced curvatures, and determining the corresponding compressive stress ($\sigma_s$), a stress profile for the sample can be developed. DOL can also be obtained in this way (see e.g., V. M. Sglavo et al., "Procedure for Residual Stress Profile Determination by Curvature Measurements," Mechanics of Materials, 37 (2005) pp. 887-898 available at http://www.sciencedirect.com/, which is incorporated by reference herein). Simultaneously, the chemical compositions of the sample after each successive etching can be measured to develop concentrations profiles to yield the relationship between chemical composition and compressive stress ($\sigma_s$) in the sample. Since stress relaxation in the crystalline materials can be minimal as compared to glasses, a simple proportionality constant can link the concentrations profiles and stress profile. Once having determined CSavg using the iterated-etch/curvature method for a sample of an IX, β-spodumene glass-ceramic of a specified starting composition and geometry (e.g., thickness . . . etc.) subjected to a specified IX treatment, one can measure concentrations profiles (i.e., composition as a function of depth) in samples of a corresponding IX, β-spodumene glass-ceramic to obtain estimates CSavg and DOL. To that end, compressive stresses ($\sigma_s$) in a sample surface layer, average surface compressive stress (CSavg) in a sample surface, average central tension (CTavg) in the center of a sample as a result of balancing tension stresses, and depth of layer (DOL) of IX, β-spodumene glass-ceramics according to aspects and/or embodiments of this disclosure can be estimated from concentration profiles of the replacing ions and/or the replaced ions using analytical techniques know to those in the art, such as, EMP, XPS, SIMS . . . etc. During an IX processes as discussed above, ions having a smaller ionic radius present in the glass-ceramic surface and/or bulk can be exchanged with ions having a larger ionic radius. As schematically illustrated in FIG. 10, when this results in compressive stresses ($\sigma_s$) in the surface 110 of a sample 100, balancing tensile stresses are induced in a central region 130 of the sample 100 to balance the forces throughout the sample 100. The average surface compression (CSavg) is related to the average central tension (CTavg) by the following relationship:

$$CSavg = CTavg \times (t-2DOL)/DOL;$$

where t is the thickness of the β-spodumene glass-ceramic sample 100 and

DOL (depth of layer 120) is the distance from the surface 110 of the sample 100 along a normal to the surface 110 to the location at which the stresses within the sample 100 change sign (i.e., zero).

For a sample 100, the integrated central tension (ICT) is given by the integral of stress throughout the tensile portion of the stress profile (i.e., central region 130 of the sample 100). ICT is related to the full thickness (t) of the sample 100, the depth of layer (DOL) 120 of the compressive stress layer, the average central tension (CTavg), and the shape or profile of the compressive stress layer by the following relationship:

$$ICT = CT \times (t-2DOL),$$

where the thickness (t−2DOL) of the central region 130 is a direction perpendicular to the surface. To balance forces within the sample 100, the integrated surface compression (ICS) has the same magnitude as the ICT, but has an opposite (minus) sign, since the overall integrated stress of the sample must be zero: −ICS+ICT=0. ICS is related to the depth of layer (DOL) 120 of the compressive stress layer, the average surface compression (CSavg), and the shape or profile of the compressive stress layer by the following relationship: ICS=CSavg×DOL, where the depth of layer (DOL) of the compressive stress region has be defined above (i.e., the distance from the surface 110 of the sample 100 along a normal to the surface 110 to the location at which the stresses within the sample 100 change sign (i.e., zero)). Making the appropriate substitutions and solving for average surface compression (CSavg) yields the above relationship. Using standard descriptions of diffusion and stress, a model as a function various process conditions (e.g., temperature, time, replacing ions, replaced ions . . . etc.) can and has been developed. A mutual diffusivity (i.e., effective diffusivity or interdiffusion coefficient related to motion of both replacing ions and replaced ions in opposite directions) is fitted to their measured concentration profiles from known process conditions. These mutual diffusivity follows an Arrhenius relationship that has an exponential dependence on the reciprocal temperature (the logarithm of the mutual diffusivity is proportional to 1/T), as is known those in the art. The boundary conditions for the diffusion calculation are based on the IX bath composition and the starting composition of the sample. For a given diffusivity, sample geometry (e.g., plate), sample or plate thickness, and IX bath composition (e.g., salt bath composition), solution of the resulting one-dimensional diffusion equation proceeds along the lines given, for example, in "The Mathematics of Diffusion," 2nd ed., 1975, by J. Crank. The stress is then proportional to the concentration of the replacing ions or replaced ions in the sample after the IX processing steps are completed, as described, for example in, "Fundamentals of Inorganic Glasses," 2nd ed., 2006, by A. K. Varshneya. In order to obey force equilibrium, it might be necessary to subtract a constant so that the resulting stress curve integrates to zero. Although at higher temperatures the effects of stress relaxation might become important in the glasses, it does not appear to be so in glass-ceramics. Knowledge of the concentrations profiles using analytical techniques know to those in the art, such as, EMP, XPS, SIMS . . . etc., in conjunction with an estimate of CSavg as from the iterated-etch/curvature method described above yields a correlation between the two measurements. Recognizing that the iterated-etch/curvature method for determining CSavg is labor-intensive and destructive to the IX, β-spodumene glass-ceramic, this correlation can be used to estimate CSavg by measurement of the concentration profiles of the IX, β-spodumene glass-ceramic. This has been tested by comparing predicted concentration profiles with measured concentration profiles, and comparison with CSavg determined through measurements of compressive stress ($\sigma_s$) in IX, glass-ceramics' surface layers and depth-of-layer (DOL), when available.

Flexural Strength of crystallizable glasses, glass-ceramics, IXable glass-ceramics, and/or IX glass-ceramics according to aspects and/or embodiments of this disclosure can be characterized by methods known to those in the art, such as, those described in ASTM C1499 (and its progeny, all herein incorporated by reference) "Determination of Monotonic Equibiaxial Flexural Strength Advanced Ceramics," ASTM International, Conshohocken, Pa., US.

Young's Modulus, Shear Modulus, and Poisson's Ratio of crystallizable glasses, glass-ceramics, IXable glass-ceramics, and/or IX glass-ceramics according to aspects and/or embodiments of this disclosure can be characterized by methods known to those in the art, such as, those described in ASTM C 1259 (and its progeny, all herein incorporated by reference) "Standard Test Method for Dynamic Young's Modulus, Shear Modulus, and Poisson's Ratio for Advanced Ceramics by Impulse Excitation of Vibration," ASTM International, Conshohocken, Pa., US.

Knoop hardness of crystallizable glasses, glass-ceramics, IXable glass-ceramics, and/or IX glass-ceramics according to aspects and/or embodiments of this disclosure can be characterized by methods known to those in the art, such as, those described in ASTM C1326 (and its progeny, all herein incorporated by reference) "Standard Test Methods for Vickers Indentation Hardness of Advanced Ceramics," ASTM International, Conshohocken, Pa., US.

Vickers hardness of crystallizable glasses, glass-ceramics, IXable glass-ceramics, and/or IX glass-ceramics according to aspects and/or embodiments of this disclosure can be characterized by methods known to those in the art, such as, those described in ASTM C1327 (and its progeny, all herein incorporated by reference) Standard Test Methods for Vickers Indentation Hardness of Advanced Ceramics," ASTM International, Conshohocken, Pa., US.

Coefficient of thermal expansion (CTE) of crystallizable glasses, glass-ceramics, IXable glass-ceramics, and/or IX glass-ceramics according to aspects and/or embodiments of this disclosure can be characterized by methods known to those in the art, such as, those described in ASTM E228 (and its progeny, all herein incorporated by reference) Standard Test Method for Linear Thermal Expansion of Solid Materials with a Push-Rod Dilatometer," ASTM International, Conshohocken, Pa., US.

Fracture toughness ($K_{1C}$) of crystallizable glasses, glass-ceramics, IXable glass-ceramics, and/or IX glass-ceramics according to aspects and/or embodiments of this disclosure can be characterized by methods known to those in the art, such as, those described in ASTM C1421 (and its progeny, all herein incorporated by reference) Standard Test Methods for Determination of Fracture Toughness of Advanced Ceramics at Ambient Temperature," ASTM International, Conshohocken, Pa., US and/or using chevron notched short bar (CNSB) specimens and/or methods substantially according to ASTM E1304 C1421 (and its progeny, all herein incorporated by reference) "Standard Test Method for Plane-Strain (Chevron-Notch) Fracture Toughness of Metallic Materials," ASTM International, Conshohocken, Pa., US.

EXAMPLES

The following examples illustrate the advantages and features of this disclosure and in are no way intended to limit this disclosure thereto Inasmuch as the sum of the individual constituents totals or very closely approximates 100, for all practical purposes the reported values may be deemed to represent mole %. The actual crystallizable glass batch ingredients may comprise any materials, either oxides, or other compounds, which, when melted together with the other batch components, will be converted into the desired oxide in the proper proportions.

TABLE I

| Oxide [mole %] | Example → 1 | 2 | 3 | 4 |
|---|---|---|---|---|
| $SiO_2$ | 69.2 | 70.1 | 71.5 | 62.8 |
| $Al_2O_3$ | 12.6 | 13.4 | 12.8 | 16.9 |
| $B_2O_3$ | 1.8 | 0 | 0 | 0.9 |
| $Li_2O$ | 7.7 | 8.1 | 7.5 | 12.9 |
| $Na_2O$ | 0.4 | 0.3 | 0.6 | 0.4 |
| MgO | 2.9 | 2.9 | 2.7 | 1.4 |
| ZnO | 1.7 | 1.0 | 0.9 | 0.6 |
| $TiO_2$ | 3.5 | 4.1 | 3.8 | 3.9 |
| $SnO_2$ | 0.1 | 0.1 | 0.1 | 0.1 |

TABLE I-continued

| $\dfrac{[Li_2O + Na_2O + MgO + ZnO + K_2O]}{[Al_2O_3 + B_2O_3]}$ | $\dfrac{12.7}{14.4} = 0.88$ | $\dfrac{12.3}{13.4} = 0.92$ | $\dfrac{11.7}{12.8} = 0.91$ | $\dfrac{15.3}{17.8} = 0.86$ |
|---|---|---|---|---|
| $\dfrac{[TiO_2 + SnO_2]}{[SiO_2 + B_2O_3]}$ | $\dfrac{3.6}{71} = 0.051$ | $\dfrac{4.2}{70.1} = 0.060$ | $\dfrac{3.9}{71.5} = 0.055$ | $\dfrac{4.0}{63.7} = 0.063$ |

| Example ⟶ Oxide [mole %] | 5 | 6 | 7 | 8 |
|---|---|---|---|---|
| $SiO_2$ | 68.5 | 73.7 | 68.9 | 69.7 |
| $Al_2O_3$ | 12.5 | 11.1 | 12.5 | 13.4 |
| $B_2O_3$ | 1.8 | 0 | 1.8 | 0 |
| $Li_2O$ | 5.0 | 5.9 | 7.7 | 8.1 |
| $Na_2O$ | 3.8 | 0.4 | 0.3 | 0 |
| MgO | 2.9 | 4.1 | 2.86 | 2.7 |
| ZnO | 1.7 | 0.78 | 1.7 | 0.9 |
| $TiO_2$ | 3.5 | 3.7 | 3.45 | 4.0 |
| $SnO_2$ | 0.1 | 0.1 | 0.1 | 0.1 |
| $K_2O$ | 0 | 0.13 | 0 | 1.0 |
| $ZrO_2$ | 0 | 0 | 0.52 | 0 |
| $\dfrac{[Li_2O + Na_2O + MgO + ZnO + K_2O]}{[Al_2O_3 + B_2O_3]}$ | $\dfrac{13.4}{14.3} = 0.94$ | $\dfrac{11.3}{11.1} = 1.02$ | $\dfrac{12.6}{14.3} = 0.88$ | $\dfrac{12.7}{13.4} = 0.95$ |
| $\dfrac{[TiO_2 + SnO_2]}{[SiO_2 + B_2O_3]}$ | $\dfrac{3.6}{70.3} = 0.051$ | $\dfrac{3.8}{73.7} = 0.05$ | $\dfrac{3.6}{81.4} = 0.044$ | $\dfrac{4.1}{63.7} = 0.059$ |

Examples 1-8

The exemplary crystallizable glasses listed in Table I were made in a platinum crucible using a batch of raw materials formulated to yield 1000 g of crystallizable glass upon melting and refining. Each crucible containing a formulated raw materials batch was placed in a furnace preheated to from 1575° C.-1650° C., the formulated raw materials batch melted and refined to produce molten crystallizable glass that was then cast as patties of crystallizable glass that were annealed for 1 h at 600° C. In this way individual patties of an exemplary crystallizable glass could then be subject to a number of different and/or similar thermal treatments (nucleated and crystallized) by placing in a static furnace programmed with such different or similar temperature-temporal cycle. Examples of some of the temperature-temporal cycles to which a number of the patties of the exemplary crystallizable glasses listed in Table I were subjected to included:
  introduce into a furnace set at between room temperature and 500° C.;
  heat at 5° C./minute (min) to the nucleation temperature (Tn) of 780° C.;
  hold at 780° C. for 2 h;
  heat at 5° C./min from 780° C. to the crystallization temperature (Tc) of 850° C.-1050° C. for $B_2O_3$ containing crystallizable glasses (Examples 1, 4, 5, and 7) while Tc of 1000° C.-1250° C. for non-$B_2O_3$ containing crystallizable glasses (Examples 2, 3, 6, and 8); and
  hold for 4 h the crystallization temperature (Tc); and
  cool to room temperature.

Some patties of crystallizable glasses of Examples 1, 4, 5, and 7 were thermally treated by nucleating (heated 5° C./min to 780° C. and held at 780° C. for 2 h) and crystallizing (heated 5° C./min from 780° C. to 975° C. and held at 975° C. for 4 h) to result in glass-ceramics. Also, some patties of crystallizable glasses of Examples 2, 3, 6, and 8 were thermally treated by nucleating (heated 5° C./min to 780° C. and held at 780° C. for 2 h) and crystallizing (heated 5° C./min from 780° C. to 1050° C. held at 1050° C. for 4 h) to result in glass-ceramics.

Thermally treated patties of crystallizable glasses listed in Table I, following thermally treatment as described above to glass-ceramics, were opaque. Also as determined by X-ray diffraction (XRD) analysis, resultant glass-ceramics exhibited a crystal phase assemblage comprising a β-spodumene solid solution as a predominant crystalline phase and one or more minor phases including various combinations of rutile alone or rutile with β-quartz solid solution and/or a spinel.

Example A

A patty of the crystallizable glass of Example 1 of Table I was thermally treated by nucleating (heated 5° C./min to 780° C. and held at 780° C. for 2 h) and crystallizing (heated 5° C./min from 780° C. to 975° C. and held at 975° C. for 4 h) to result in a glass-ceramic. A sample of the glass-ceramic measuring 50×50 mm square having a thickness of 0.8 mm was produced and the surfaces prepared to an optical polish. The opacity of this sample was determined by measuring the spectral reflectivity of the polished sample using black and white backgrounds behind the sample. The opacity of the sample being the ratio of sample reflectances measured in the two configurations; a value of 1 being 100% opaque. FIG. 1 illustrates the opacity exhibited by this example and as can be seen, the value of opacity exceeds greater than 90% opacity over the wavelength range of 250-750 nm.

Examples B-D

Three patties of the crystallizable glass of Example 1 of Table I were thermally treated using different crystallization conditions to result in glass-ceramics. Each of the patties was nucleated in the same manner as described for Example 1 above (heated 5° C./min to 780° C. and held at 780° C. for 2 h) however each was crystallized for 4 h at the different temperatures disclosed in Table II (heated 5° C./min from 780° C. to Tc [° C.] and held at Tc [° C.] for 4 h). As determined by XRD analysis, resultant glass-ceramics exhibited a crystal phase assemblage comprising a β-spodumene solid solution as a predominant crystalline phase and a minor phase including rutile. Amounts, in wt %, of the crystalline phases and the residual glass for each sample was likewise determined using Rietveld analysis methods known to those in the art, such as, those described in Taylor, J. C. (2004, 2003, & 2001), "Rietveld Made Easy: A Practical Guide to the Understanding of the Method and Successful Phase Quantifications," Can berra: Sietronics Pty Ltd. (ISBN 0 9750798 0 8) and Young, R. A. (1993), "The Rietveld Method," Oxford: University Press. (ISBN 0 19 855577 6), which are incorporated by reference herein, and is summarized in Table II.

TABLE II

| Example | Tc [° C.] | residual glass [wt %] | β-spodumene [wt %] | rutile [wt %] |
|---|---|---|---|---|
| B | 950 | 1.5 | 95.3 | 3.2 |
| C | 975 | 3.4 | 92.1 | 4.5 |
| D | 1000 | 4.1 | 87.1 | 8.8 |

Figure 2:
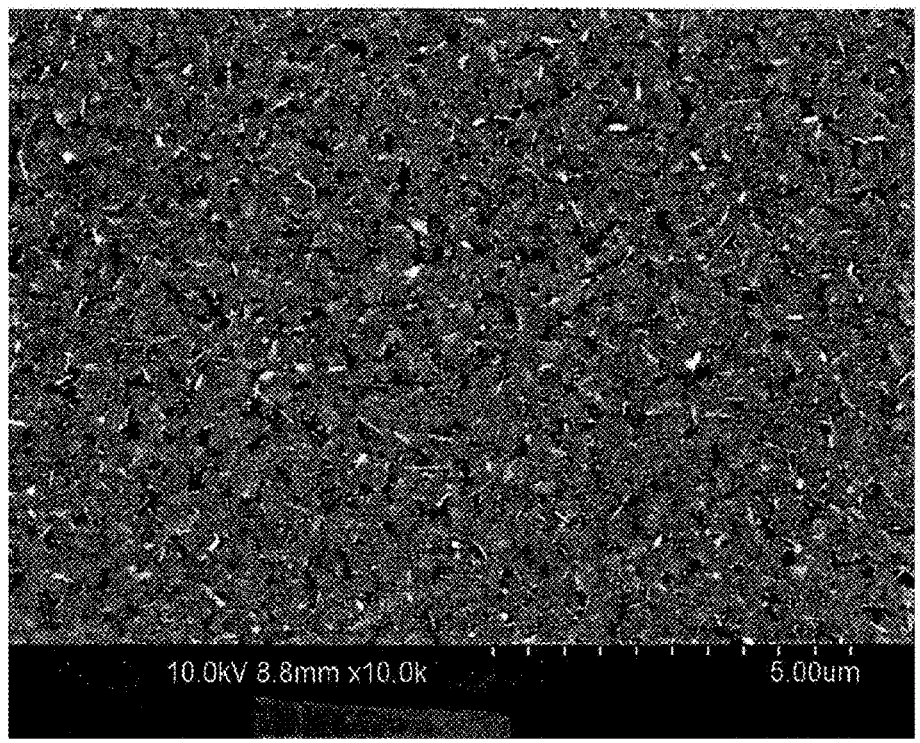
FIG. 2 shows a scanning electron microscope (SEM) back-scattered electron image (BEI) micrograph of a β-spodumene glass-ceramic illustrating β-spodumene as a predominant crystalline phase, a Ti-containing crystalline phase as a minor crystalline phase, and an optional spinel crystalline phase as another minor crystalline phase according to aspects and/or embodiments of this disclosure.
Figure 3:
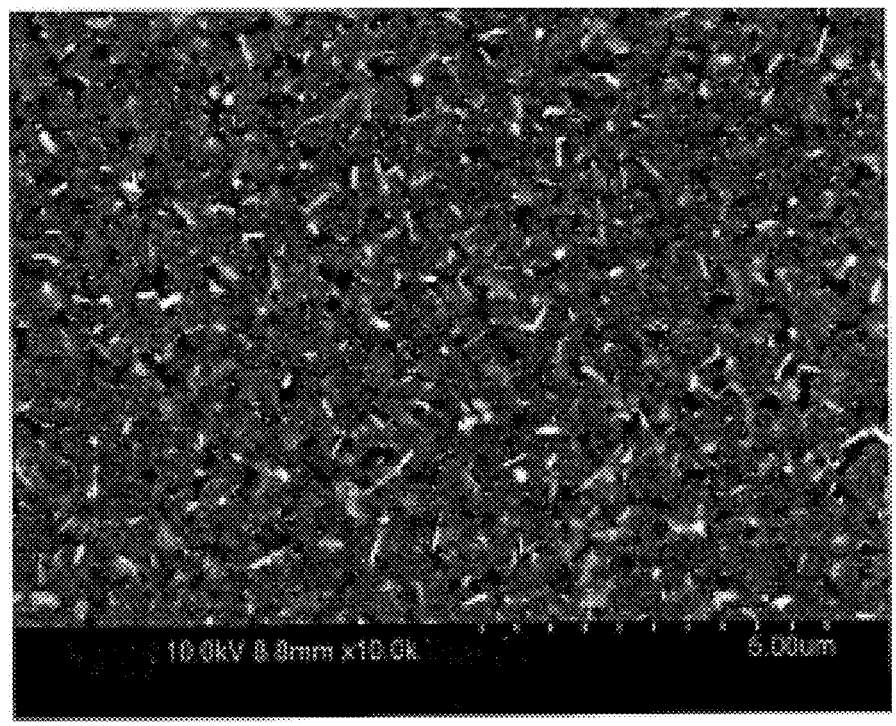
FIG. 3 shows a SEM micrograph (BEI) of glass-ceramic illustrating β-spodumene as a predominant crystalline phase, a Ti-containing crystalline phase, which includes rutile, as a minor crystalline phase, and an optional spinel crystalline phase as another minor crystalline phase according to aspects and/or embodiments of this disclosure.
Figure 4:
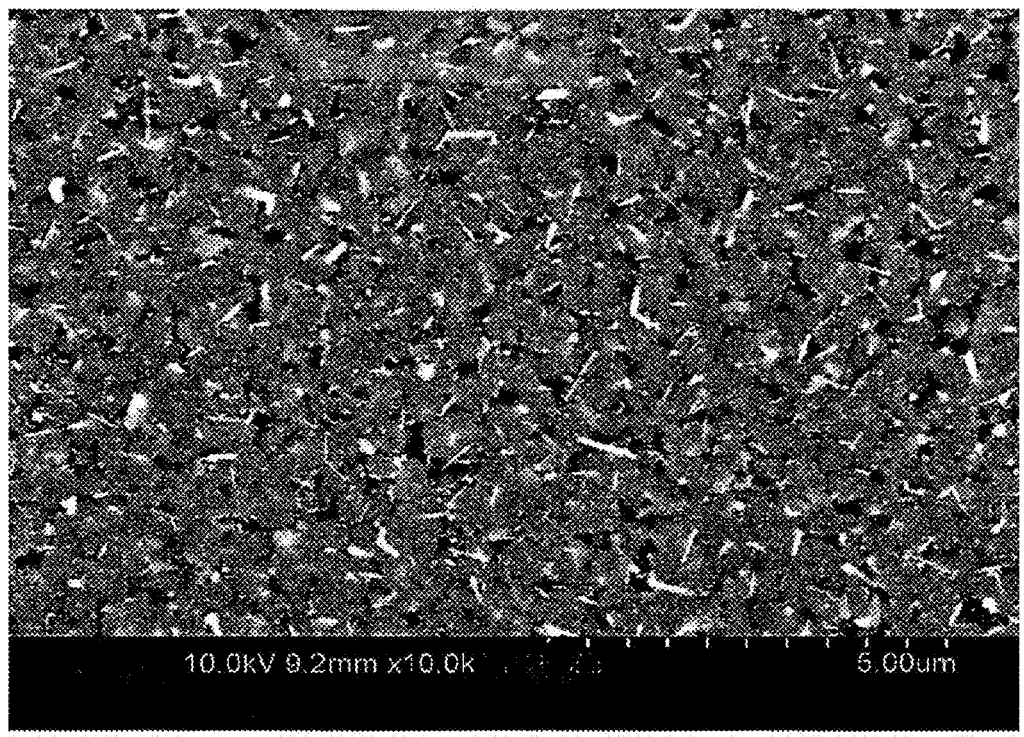
FIG. 4 shows a SEM micrograph (BEI) of glass-ceramic illustrating β-spodumene as a predominant crystalline phase, a Ti-containing crystalline phase as a minor crystalline phase, and an optional spinel crystalline phase as another minor crystalline phase according to aspects and/or embodiments of this disclosure.

FIG. 2-4 are scanning electron microscope (SEM) backscattered electron image (BEI) micrograph taken at a magnification of 10,000× illustrating the crystal phase assemblage of each of the so-produced glass-ceramics. An examination of each of the micrographs reveals a crystal phase assemblage which comprises β-spodumene as a predominant crystalline phase as evidenced by the medium gray larger crystals and a rutile crystalline phase as minor crystalline phase as evidenced by the needle-like smaller bright crystals; these acicular rutile crystals which clearly exhibit a size greater than 0.05 µm are, as described above, provide the opacity and whiteness levels to the glass-ceramic examples. Additionally it should be noted that the dark areas in the micrograph among the illustrated crystalline phase are residual glass while the knobby features on the β-spodumene crystalline phase are gahnite spinel crystals.

Example E-K

Six patties of the crystallizable glass of Example 1 of Table I were thermally treated using different crystallization conditions to result in glass-ceramics. Each of the patties was nucleated in the same manner as described for Example 1 above (heated 5° C./min to 780° C. and held at 780° C. for 2 h) however each was crystallized for 4 h at the different temperatures disclosed in Table III (heated 5° C./min from 780° C. to Tc [° C.] and held at Tc [° C.] for 4 h). One inch diameter disks of resultant glass-ceramics having a 0.8 mm thickness were produced and the surfaces prepared to an optical polish. As determined by XRD analysis, resultant glass-ceramics exhibited a crystal phase assemblage comprising a β-spodumene solid solution as a predominant crystalline phase and minor phases including rutile and gahnite. Amounts (wt %) of the residual glass as well as amounts (wt %) and sizes (µm) of the crystalline phases for each sample were likewise determined using Rietveld analysis known to those skilled in the art and are summarized Table III

TABLE III

| Example | Tc [° C.] | glass wt % | β-spodumene wt % | β-spodumene size (µm) | gahnite wt % | gahnite size (µm) | rutile wt % | rutile size (µm) |
|---|---|---|---|---|---|---|---|---|
| E | 900 | 6.6 | 78.5 | 0.3 | 10.4 | 0.05 | 4.5 | 0.06 |
| F | 925 | 6.6 | 78.5 | 0.3 | 10.4 | 0.05 | 4.5 | 0.06 |
| G | 950 | 7 | 78.1 | 0.3 | 10.3 | 0.05 | 4.6 | 0.08 |
| H | 975 | 7 | 77.8 | 0.4 | 10.3 | 0.05 | 4.8 | 0.1 |
| I | 1000 | 7.3 | 77.6 | 0.5 | 10.2 | 0.06 | 4.9 | 0.14 |
| J | 1025 | NA | NA | NA | NA | NA | NA | NA |
| K | 1050 | 7.8 | 77.3 | 0.6 | 10 | 0.06 | 4.9 | 0.17 |

NA = not applicable or not determined

Color (L*a*b* color coordinates) were determined for each of the Examples E-K determined from reflectance spectra measurements with specular reflectance included using a spectrophotometer and analyzed using GRAMS software. Table IV reports the CIELAB color space coordinates L*, a*, and b* presented for a CIE illuminant F02 exhibited by these β-spodumene glass-ceramics.

TABLE IV

| | | CIE illuminant F02 | | |
|---|---|---|---|---|
| Example | Tc [° C.] | L* | a* | b* |
| E | 900 | 88.43 | −2.64 | −5.44 |
| F | 925 | 93.17 | −1.18 | −2.31 |
| G | 950 | 94.43 | −0.82 | −1.46 |
| H | 975 | 95.31 | −0.58 | −0.85 |
| I | 1000 | 95.76 | −0.49 | −0.5 |
| J | 1025 | 96.13 | −0.36 | 0.07 |
| K | 1050 | 96.16 | −0.35 | 0.14 |

Examples L-N

Figure 5:
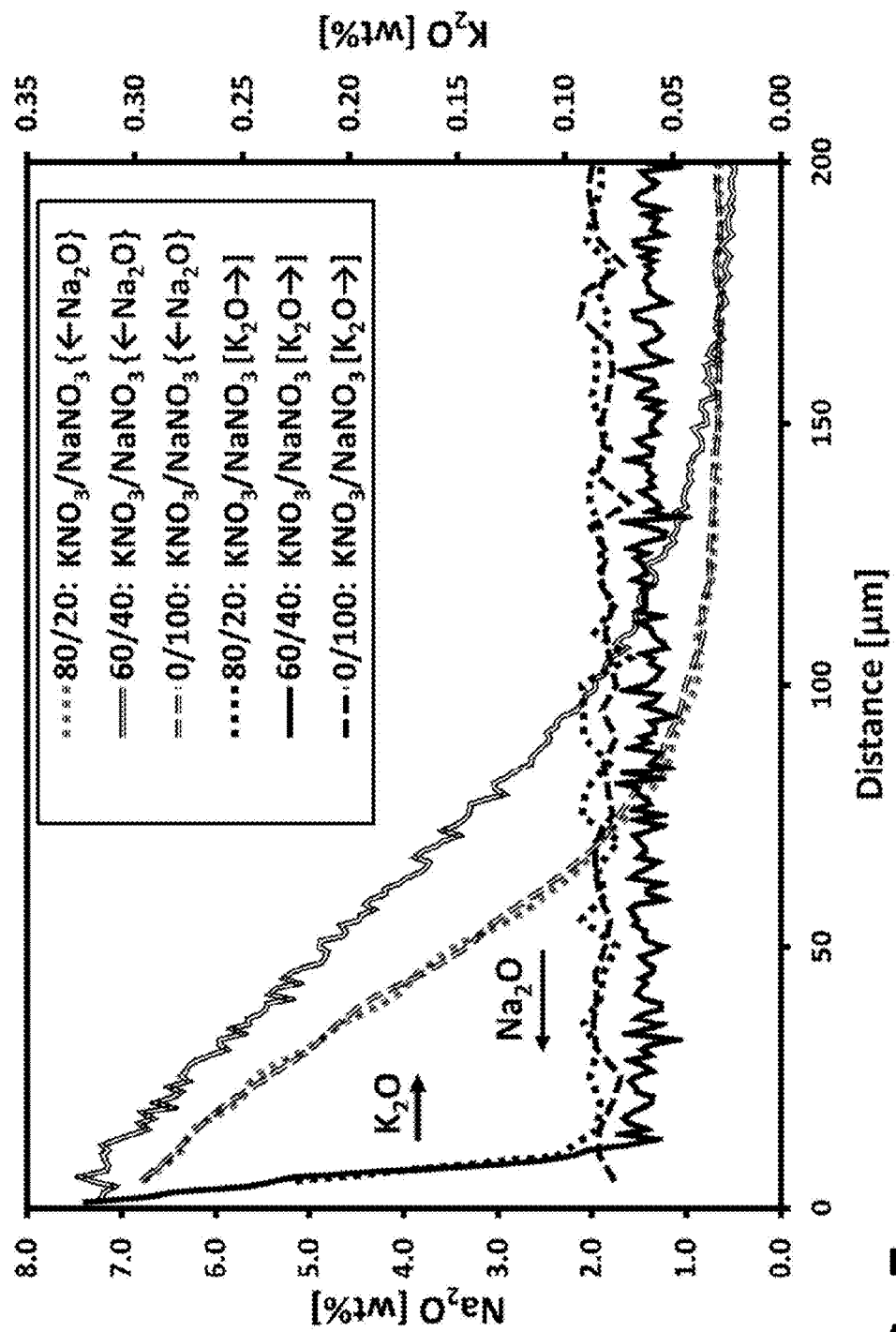
FIG. 5 shows the sodium (Na) and potassium (K) profiles measured by electron microprobe analysis for a β-spodumene glass-ceramic subjected to ion exchange ("IX") treatments having three different treatment conditions (two mixed) according to other aspects and/or embodiments of this disclosure.

Three patties of the crystallizable glass of Example 1 of Table I were thermally treated using crystallization conditions to result in glass-ceramics. Each of the patties was nucleated in the same manner as described for Example 1 above (heated 5° C./min to 780° C. and held at 780° C. for 2 h) however all were was crystallized 4 h at 950° C. (heated 5° C./min from 780° C. to 950° C. and held at 950° C. for 4 h). Groups of samples of the glass-ceramics measuring 50×50 mm square having a thickness of 0.8 mm were produced and the surfaces prepared to an optical polish. Samples from three groups were then placed in three separate molten salt IX baths (two mixed and one pure) under the following conditions:
 80 wt % $KNO_3$ and 20 wt % $NaNO_3$ a temperature of 430° C. for a period of 2 h;
 60 wt % $KNO_3$ and 40 wt % $NaNO_3$ at a temperature of 430° C. for a period of 4½ h; and
 0 wt % $KNO_3$ and 100 wt % $NaNO_3$ at a temperature of 430° C. for a period of 2 h;
These times and temperatures were sufficient to allow for sufficient Li+ for Na+ ion exchange so as to result in a compressive stress ($\sigma_s$) in the surface (alternatively, surface layer exhibiting a compressive stress ($\sigma_s$) in the surface) above 300 MPa. FIG. 5 illustrates electron microprobe analysis illustrating respective $Na_2O$ and $K_2O$ (in wt %) for each of the IX, glass-ceramics as a function of depth.

Examples O-P

Two additional patties of the crystallizable glass of Example 1 of Table I were thermally treated using crystallization conditions to result in glass-ceramics. Each of the patties was nucleated in the same manner as described for Example 1 above (heated 5° C./min to 780° C. and held at 780° C. for 2 h) however all were was crystallized 4 h at 950° C. (heated 5° C./min from 780° C. to 950° C. and held at 950° C. for 4 h). Groups of samples of the glass-ceramics measuring 50×50 mm square having a thickness of 0.8 mm were produced and the surfaces prepared to an optical polish. Samples from these groups were then placed in two separate molten salt IX baths treatments (one control/standard and one involving a two step treatment):

100 wt % $NaNO_3$ at a temperature of 430° C. for a period of 2 h;

80 wt % $Li_2SO_4$ and 20 wt % $K_2SO_4$ at a temperature of 430° C. for a period of 8 h, followed by 100 wt % $NaNO_3$ at a temperature of 430° C. for a period of 2 h.

Figure 6:
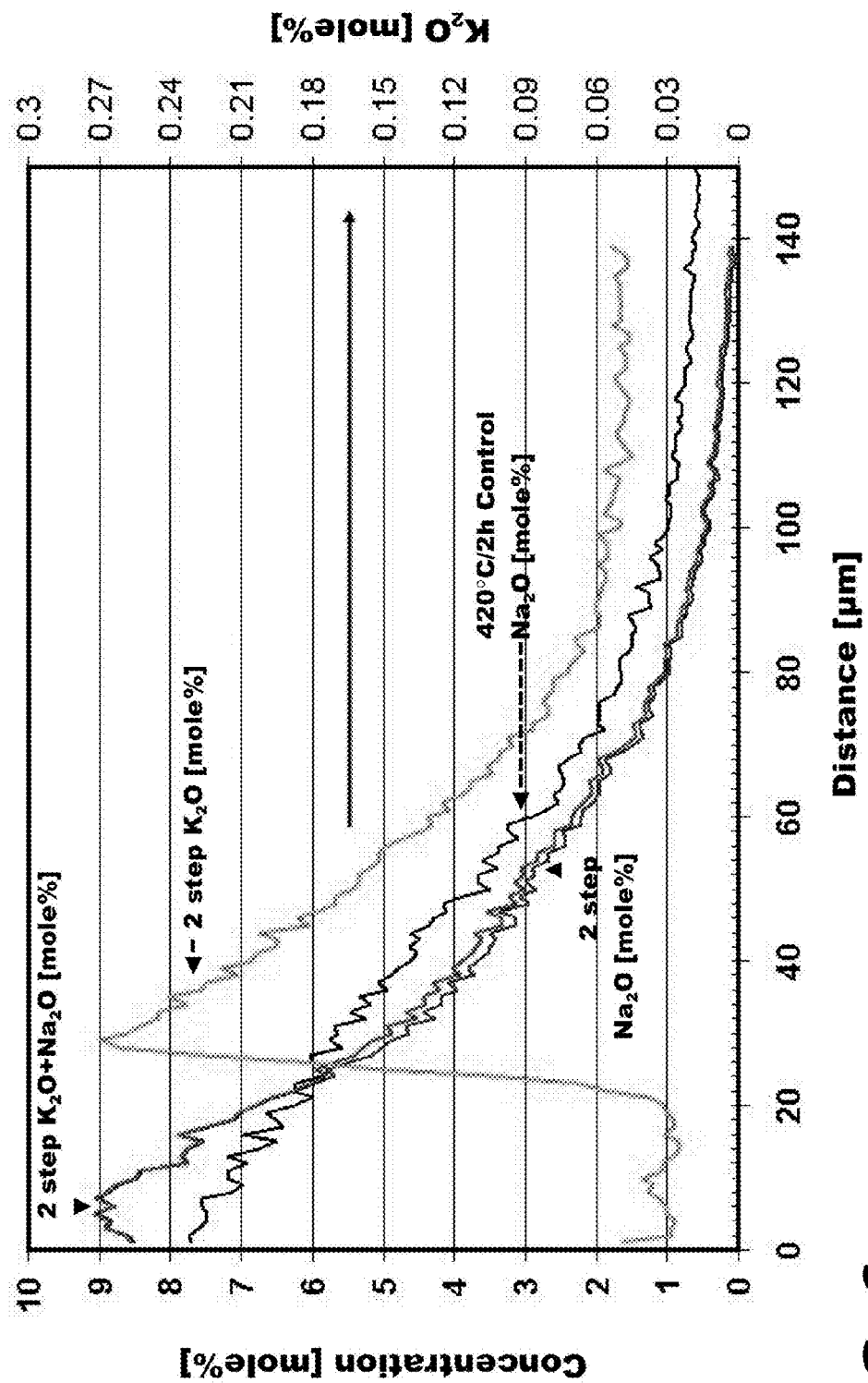
FIG. 6 shows the sodium (Na) and potassium (K) profiles measured by electron microprobe analysis for a β-spodumene glass-ceramic subjected to different two-step IX treatments according to still other aspects and/or embodiments of this disclosure.

Again these times and temperatures were sufficient to allow for sufficient Li+ for Na+ ion exchange so as to result in a compressive stress ($\sigma_s$) in the surface (alternatively, surface layer exhibiting a compressive stress ($\sigma_s$) in the surface) above 300 MPa. The two-step IX treatment resulted in increased Na at the surface (with presumably higher compressive stress ($\sigma_s$)) and a buried potassium peak, also thought to impart increased strength. FIG. 6 illustrates electron microprobe analysis illustrating respective $Na_2O$ and $K_2O$ (in mole %) for each of the IX, glass-ceramics as a function of depth.

Examples Q-R

Figure 7:
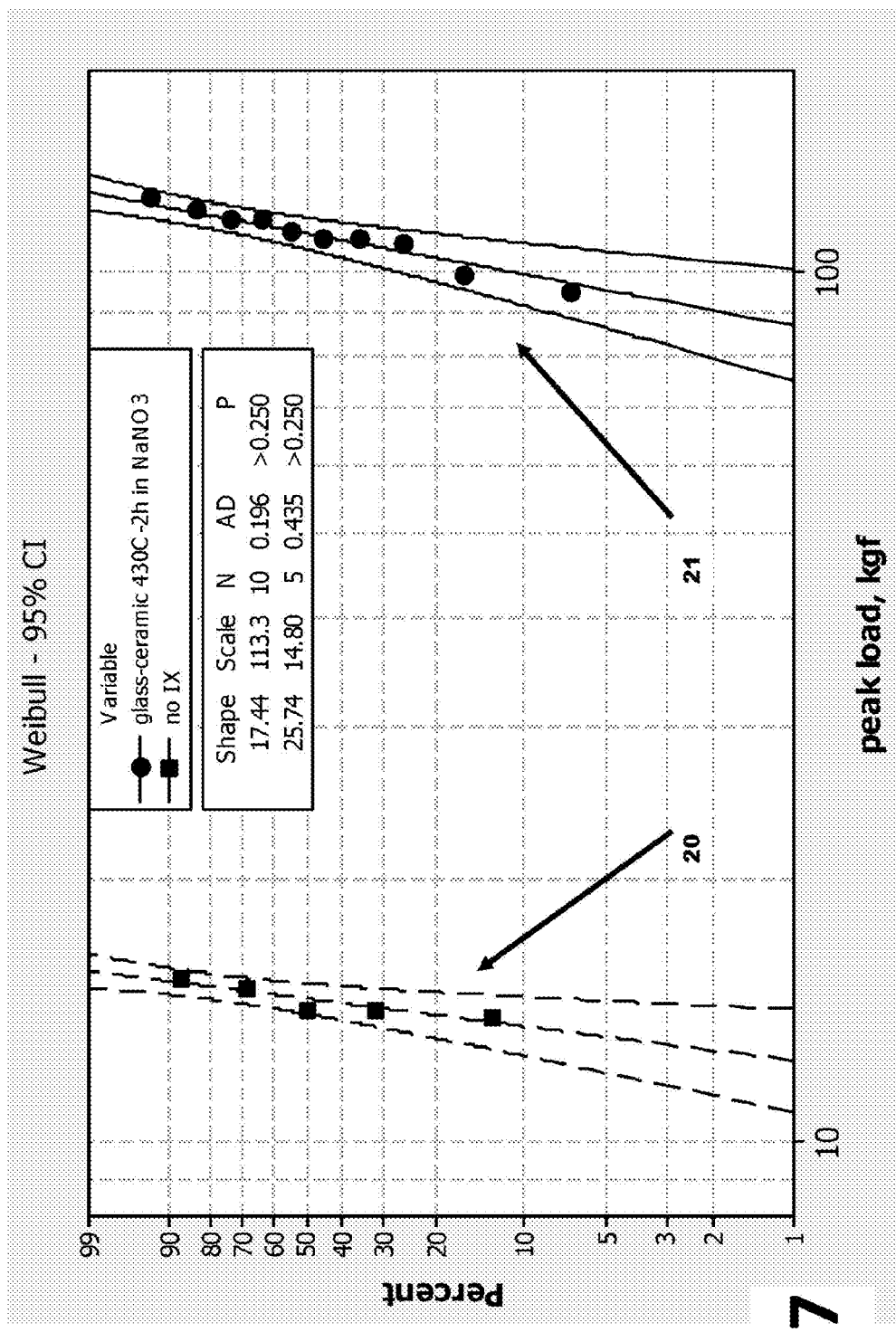
FIG. 7 shows Weibull plots of strength (peak load characterized by mechanical/abraded ring-on-ring method know to those in the art and described in ASTM C1499) for a non IX, β-spodumene glass-ceramic (■) and an IX β-spodumene glass-ceramic (●) according to aspects and/or embodiments of this disclosure.

Two additional crystallizable glasses and corresponding glass-ceramics of the composition of Example 1 of Table I above were made using the same melting, refining, and nucleation conditions but different crystallization conditions. Each of the samples was nucleated in the same manner as described for Example 1 above (5° C./min to 780° C. and hold at 780 for 2 h) however each was crystallized for 4 h at 950° C. Groups of samples of the glass-ceramics measuring 50×50 mm square having a thickness of 0.8 mm were produced and the surfaces prepared to an optical polish. One sample from the group was subjected to a standard IX bath treatment (100% $NaNO_3$ at a temperature of 430° C. for a period of 2 h) while the other was not (nonIX). The equibiaxial flexural strength of IX and nonIX samples was determine (particularly ROR according to ASTM C 1499 was performed on each utilizing 5 psi SiC). FIG. 7 shows Weibull plots of flexural strength (peak load characterized by mechanical/abraded ring-on-ring method know to those in the art and described in ASTM C1499) for the nonIX glass-ceramic (■) and the IX glass-ceramic (●). The results in FIG. 7 reveal that the IX glass-ceramic (●) exhibits a significantly higher peak load (75-100 kgf) than the nonIX glass-ceramic (■) (10-20 kgf). The results in FIG. 7 also reveal that the IX glass-ceramic (●) exhibits peak load values comparable to IX alkali alumino silicate glasses.

TABLE V

|  | Tn [° C.] | | | |
|---|---|---|---|---|
|  | 780 | 780 | 780 | 780 |
|  | Tc [° C.] | | | |
|  | 925 | 1000 | 1075 | 1150 |
| Fracture Toughness ($K_{1C}$ [MPa·m$^{1/2}$]) | 0.899 | 0.949 | 0.990 | 1.060 |
|  | 0.901 | 0.950 | 0.997 | 1.062 |
|  | 0.902 | 0.952 | 1.014 | 1.069 |
|  | 0.906 | 0.961 | 1.019 | 1.077 |
|  | 0.906 | 0.963 | 1.027 | 1.087 |
|  | 0.906 | 0.965 | 1.030 | 1.090 |
|  | 0.907 | 0.967 | 1.040 | 1.091 |

TABLE V-continued

|  | Tn [° C.] | | | |
|---|---|---|---|---|
|  | 780 | 780 | 780 | 780 |
|  | Tc [° C.] | | | |
|  | 925 | 1000 | 1075 | 1150 |
|  | 0.919 | 0.970 | 1.041 | 1.097 |
|  | NA | NA | 1.052 | 1.105 |
|  | NA | NA | 1.061 | 1.105 |
| avg$K_{1C}$ [MPa·m$^{1/2}$] | 0.906 | 0.960 | 1.027 | 1.084 |
| stdev$K_{1C}$ [MPa·m$^{1/2}$] | 0.006 | 0.008 | 0.023 | 0.017 |

Figure 8:
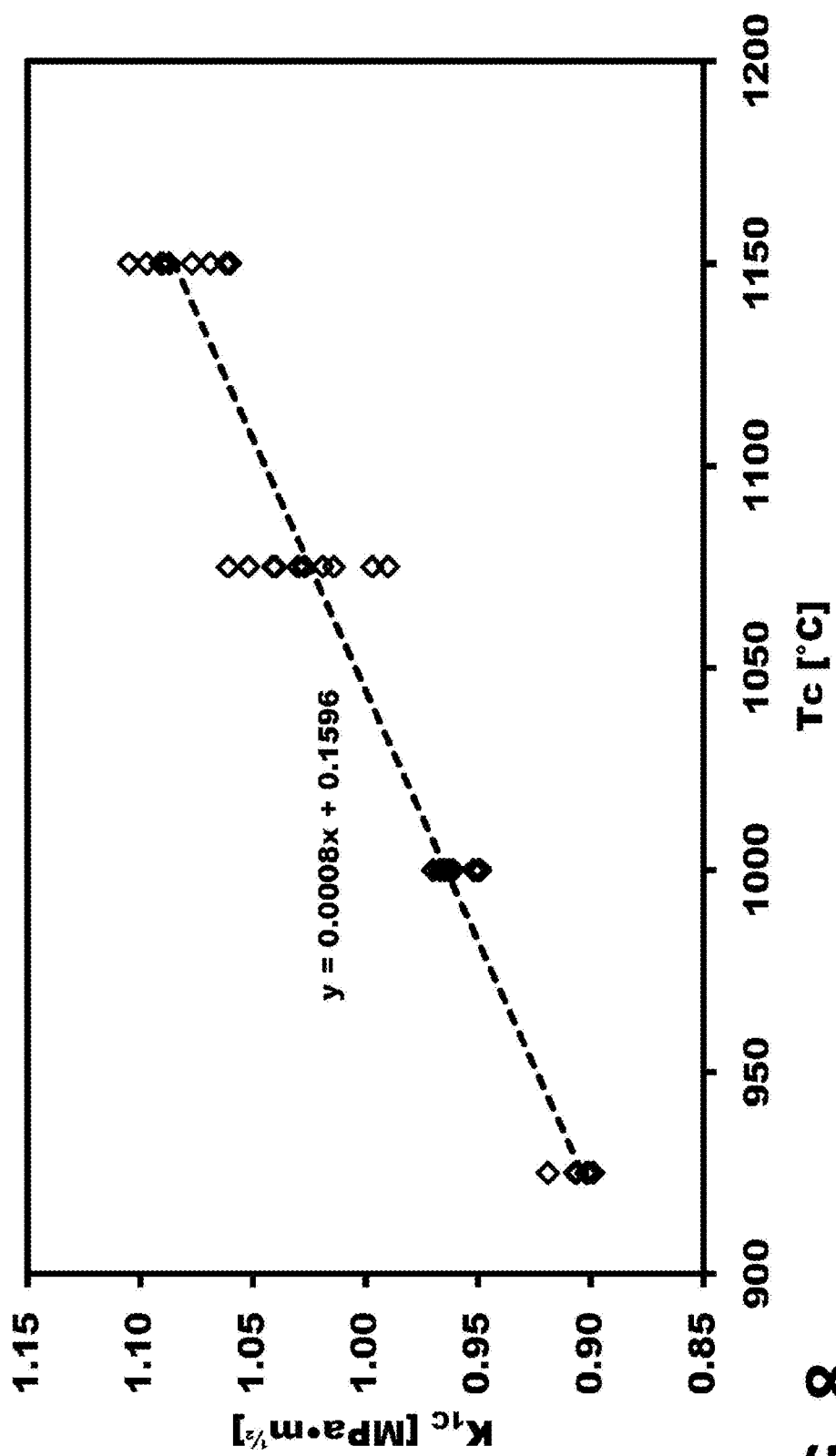
FIG. 8 shows fracture toughness as a function of crystal growth (or crystallization temperature {Tc}) for β-spodumene glass-ceramics according to aspects and/or embodiments of this disclosure.

Fracture Toughness ($K_{1C}$ [MPa·m$^{1/2}$]) determined using chevron notched short bar (CNSB) specimens: length (W) = 0.564 inch(in); half-height (H) = 0.324 in; thickness (B) = 0.374 in; length less the distance to the chevron tip (W-$a_0$) = 0.398; and slot angle ($\phi$) = 59 degrease; substantially according to ASTM E-1304 test procedure Examples S-U Four additional patties of the crystallizable glass of Example 1 of Table I were thermally treated using different crystallization conditions to result in glass-ceramics. Each of the patties was nucleated in the same manner as described for Example 1 above (heated 5° C./min to 780° C. and held at 780° C. for 2 h) however each was crystallized for 4 h at the different temperatures disclosed in Table V (heated 5° C./min from 780° C. to Tc [° C.] and held at Tc [° C.] for 4 h). Samples of each of the glass-ceramics where prepared as chevron notched short bar (CNSB) specimens having dimensions: length (W)=0.564 inch (in); half-height (H)=0.324 in; thickness (B)=0.374 in; length less the distance to the chevron tip (W-$a_0$)=0.398; and slot angle ($\phi$)=59 degrease; substantially according to ASTM E1304 1304 test procedure. The fracture toughness ($K_{1C}$ [MPa·m$^{1/2}$]) of each specimen was determined and is summarized in Table V. FIG. 8 shows the fracture toughness ($K_{1C}$ [MPa·m$^{1/2}$]) as a function of crystallization temperature (Tc [° C.]).

Example V-W

Figure 9:
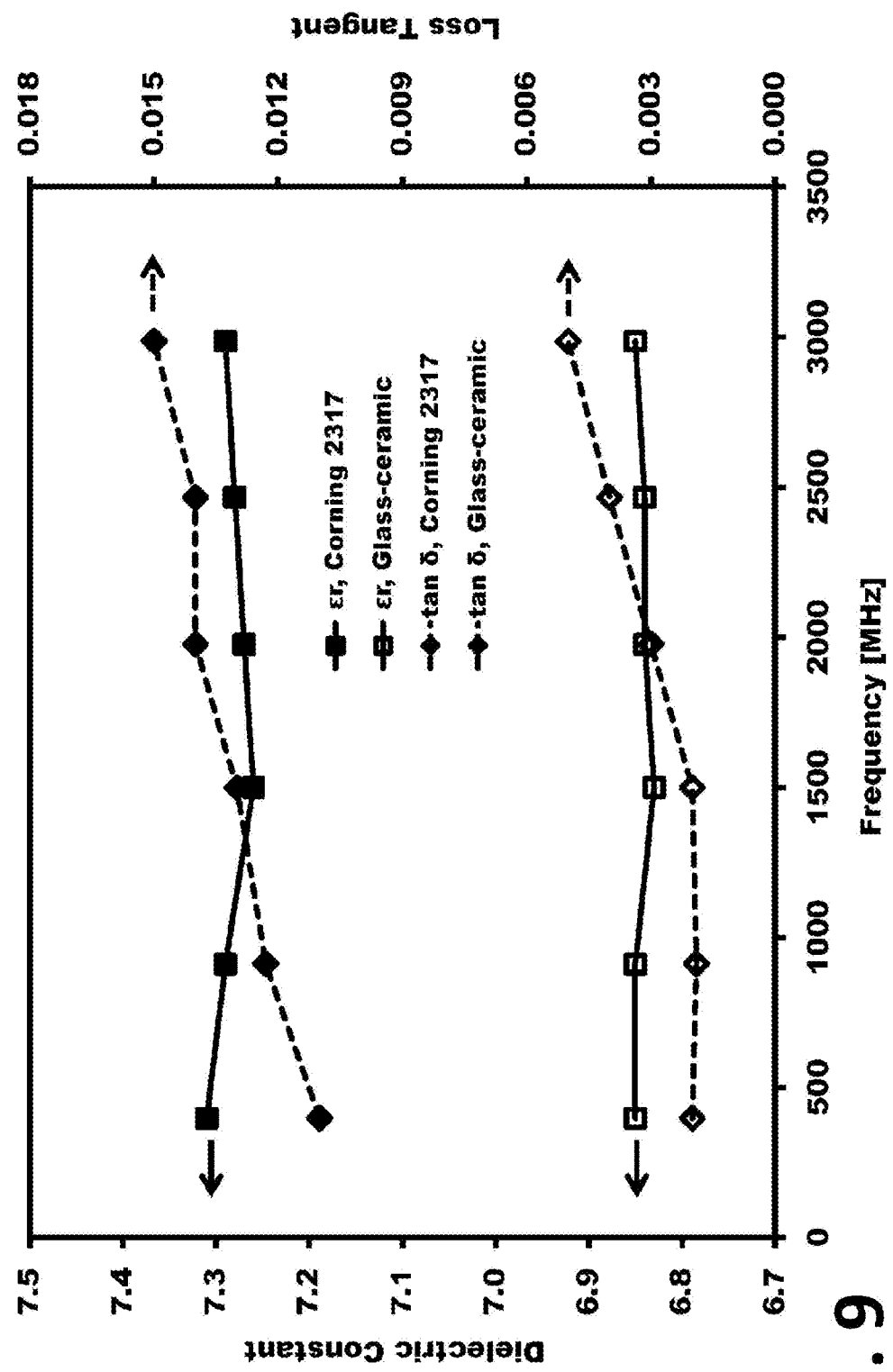
FIG. 9 shows loss tangent (◇,◆) and dielectric constant (□,■) as a function of frequency for a Corning 2317 Gorilla® alkali-alumino silicate glass (■,◆) and a β-spodumene glass-ceramic (□,◇) made using crystallizable glasses according to aspects and/or embodiments of this disclosure.

Two additional crystallizable glasses and corresponding glass-ceramics of the composition of Example 1 of Table I above were made using the same melting, refining, and nucleation conditions but different crystallization conditions. Each of the samples was nucleated in the same manner as described for Example 1 above (5° C./min to 780° C. and hold at 780 for 2 h) however each was crystallized for 4 h at 950° C. Cylindrical samples of a Corning 2317 Gorilla® alkali-alumino silicate glass and the glass-ceramics measuring 3 mmØ×12 mm long were produced and the surfaces prepared to an optical polish. These cylindrical samples were subject to RF transparency testing (loss tangent and dielectric constant). FIG. 9 shows the loss tangent (◇,♦) and dielectric constant (□,■) as a function of frequency between 500 MHz to 3000 MHz for the Corning 2317 Gorilla® alkali-alumino silicate glass (■,♦) and the glass-ceramic (□,◇) of these examples.

Example X-Y

Two additional patties of the crystallizable glass of Example 1 of Table I were thermally treated using crystallization conditions to result in glass-ceramics. Each of the patties was nucleated in the same manner as described for Example 1 above (heated 5° C./min to 780° C. and held at 780° C. for 2 h) however all were was crystallized 4 h at 950° C. (heated 5° C./min from 780° C. to 950° C. and held at 950° C. for 4 h). Groups of samples of the glass-ceramics measuring 50×50 mm square having a thickness of 0.8 mm were produced and the surfaces prepared to an optical polish. Some samples from these groups were subjected to a standard molten salt IX bath treatment (100% NaNO₃ at a temperature of 430° C. for a period of 2 h) while others were not (nonIX glass-ceramics). Still other samples from these groups as well as some samples of the crystallizable glass of Example 1 of Table I were subjected to various mechanical and physical properties measurements reported in Table VI and Table VII including Vickers and Knoop Hardness, elastic modulus (E), shear modulus (G), Poisson's ratio (v), CTE, Strain Point and Annealing Point.

TABLE VI

| Material Property | | | Sample Condition | Test Method |
|---|---|---|---|---|
| CTE (0° C.-300° C.) | [× 10⁻⁷/ °C.] | 12 +/− 2 | nonIX | Dilatometer (0° C.-600° C.) ASTM E-228 (best fit line to linear data 20° C.-300° C.) |
| Strain Point | [° C.] | 790 +/− 10 | nonIX | BBV |
| Annealing Point | [° C.] | 872 +/− 10 | nonIX | BBV | nonIX = not ion exchanged
BBV = use of an Orton ® model BBV series beam bending viscometer to determine strain point and/or annealing temperatures of a solid glass sample (precision cut beam, rod, or tube) according to the ASTM C-598 test procedure

TABLE VII

| Mechanical Property | | | Sample Condition | Thickness [mm] |
|---|---|---|---|---|
| Hardness | Vickers mean, +/− Std Dev [kgf/mm²] | 750 ± 20 | nonIX | 0.8 |
| | Vickers mean, +/− Std Dev [kgf/mm²] | 776 ± 21 | IX (430° C.-2 h) | 0.8 |
| | Knoop mean, +/− Std Dev [kgf/mm²] | 671 ± 20 | nonIX | 0.8 |
| | Knoop mean, +/− Std Dev [kgf/mm²] | 705 ± 12 | IX (430° C.-2 h) | 0.8 |
| Fracture Toughness | $K_{IC}$ [MPa · m$^{1/2}$] | 0.92 | nonIX | NA |
| Moduli | E (elastic) [GPa] | 87 | nonIX | NA |
| | G (shear) [GPa] | 35 | nonIX | NA |
| Poisson's Ratio | $v = \{(E/2G) - 1\}$ | 0.26 | nonIX | NA | nonIX = not ion exchanged
IX = ion exchanged or subjected to ion exchange treatment for (temperature-time)
kgf = kilograms-force
kgf/mm² = kilograms-force per square millimeter
NA = not applicable or not determined
Fracture Toughness ($K_{IC}$ [MPa · m$^{1/2}$]) determined using chevron notched short bar (CNSB) specimens: length (W) = 0.564 inch(in); half-height (H) = 0.324 in; thickness (B) = 0.374 in; length less the distance to the chevron tip (W-a0) = 0.398; and slot angle (φ) = 59 degrase; substantially according to ASTM E-1304 test procedure Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

We claim:
1. An IX, β-spodumene glass-ceramic comprising:
  a. a nominal composition, in mole percent (mole %), comprising:
    i. 62-75 SiO₂;
    ii. 10.5-17 Al₂O₃;
    iii. 5-13 Li₂O;
    iv. 0-4 ZnO;
    v. 0-8 MgO;
    vi. 2-5 TiO₂;
    vii. 0-4 B₂O₃;
    viii. 0-5 Na₂O;
    ix. 0-4 K₂O;
    x. 0-2 ZrO₂;
    xi. 0-7 P₂O₅
    xii. 0-0.3 Fe₂O₃;
    xiii. 0-2 MnOx; and
    xiv. 0.05-0.20 SnO₂;
  b. a ratio:

$$\frac{[Li_2O + Na_2O + K_2O + MgO + ZnO]}{[Al_2O_3 + B_2O_3]}$$

between 0.7 to 1.5;
  c. a ratio:

$$\frac{[TiO_2 + SnO_2]}{[SiO_2 + B_2O_3]}$$

greater than about 0.04;
  d. one or more β-spodumene solid solutions comprising at least about 70 wt % of the crystalline phases of the glass-ceramic;
  e. at least one Ti-containing crystalline phase comprising:
    i. about 2.5-8 wt % of the crystalline phases of the glass-ceramic,
    ii. a morphology exhibiting a length ≥about 20 nm, and
    iii. rutile;
  f. an opacity comprising ≥about 85% over the wavelength range of 400-700 nm for an about 0.8 mm thickness;
  g. a depth of layer (DOL) ≥about 2% of an overall thickness of an article of the IX, β-spodumene glass-ceramic and a compressive stress ($\sigma_s$) in at least a portion of a surface of the article of at least about 300 MPa; and
  h. optionally, one or more crystalline phase comprising:
    i. up to about 10 wt % of the crystalline phases of the glass-ceramic and
    ii. a spinel structure,
wherein the at least one Ti-containing crystalline phase further comprises any one of anatase, a magnesium titanate, and an aluminum titanate; or further comprising mixtures of rutile and two or more of anatase, a magnesium titanate, and an aluminum titanate.

2. The IX, β-spodumene glass-ceramic according to claim 1, further comprising cordierite or mixtures of rutile, cordierite, and one or more of anatase, a magnesium titanate, and an aluminum titanate.

3. The IX, β-spodumene glass-ceramic according to claim 1, wherein the at least one Ti-containing crystalline phase comprises rutile comprising about 2-6 wt % of the crystalline phases of the glass-ceramic.

4. The IX, β-spodumene glass-ceramic according to claim 1, wherein the one or more β-spodumene solid solutions comprise at least about 75 wt % of the crystalline phases of the glass-ceramic.

5. The IX, β-spodumene glass-ceramic according to claim 1, wherein the optional one or more crystalline phase comprises:
  about 1-10 wt % of the crystalline phases of the glass-ceramic and
  a Zn-containing spinel structure.

6. The IX, β-spodumene glass-ceramic according to claim 1, wherein the IX, β-spodumene glass-ceramic exhibits one or more of:
   a. a fracture toughness of greater than about 0.8 MPa·m$^{1/2}$; or
   b. MOR of greater than 40,000 psi; or
   c. a dielectric constant determined over a frequency between about 15 MHz-3.0 GHz at about 25° C. of less than about 10; or
   d. a loss tangent determined over a frequency between about 15 MHz-3.0 GHz at about 25° C. of less of less than 0.02; or
   e. a depth of layer (DOL) ≥about 40 μm in at least a portion of a surface of an article of the IX, β-spodumene glass-ceramic having a 2 mm overall thickness; or
   f. a compressive stress ($\sigma_s$) of at least about 500 MPa in at least a portion of a surface of an article of the IX, β-spodumene glass-ceramic having a 2 mm overall thickness; or
   g. any combination of two or more of the preceding.

7. The IX, β-spodumene glass-ceramic according to claim 1, wherein the glass-ceramic comprises a color presented in CIELAB color space coordinates for an observer angle of 10° and a CIE illuminant F02 determined from reflectance spectra measurements using a spectrophotometer with specular reflectance included comprising:
   a. CIE a* between −3 and +3;
   b. CIE b* between −6 and +6; and
   c. CIE L* between 88 and 97.

8. The IX, β-spodumene glass-ceramic according to claim 1, wherein the-β-spodumene solid solutions comprise a Li$_2$O:Al$_2$O$_3$:SiO$_2$ ratio between about 1:1:4.5-1:1:8.

9. The IX, β-spodumene glass-ceramic according to claim 1, wherein the Ti-containing crystalline phase comprises an acicular morphology.

10. A glass-ceramic comprising:
   a. a composition, in mole %, comprising:
      i. 62-75 SiO$_2$;
      ii. 10.5-17 Al$_2$O$_3$;
      iii. 5-13 Li$_2$O;
      iv. 0-4 ZnO;
      v. 0-8 MgO;
      vi. 2-5 TiO$_2$;
      vii. 0-4 B$_2$O$_3$;
      viii. 0-5 Na$_2$O;
      ix. 0-4 K$_2$O;
      x. 0-2 ZrO$_2$;
      xi. 0-7 P$_2$O$_5$
      xii. 0-0.3 Fe$_2$O$_3$;
      xiii. 0-2 MnOx; and
      xiv. 0.05-0.20 SnO$_2$.
   b. a ratio:

$$\frac{[Li_2O + Na_2O + K_2O + MgO + ZnO]}{[Al_2O_3 + B_2O_3]}$$

between 0.7 to 1.5;
   c. a ratio:

$$\frac{[TiO_2 + SnO_2]}{[SiO_2 + B_2O_3]}$$

greater than about 0.04;
   d. one or more β-spodumene solid solutions comprising at least about 70 wt % of the crystalline phases of the glass-ceramic;
   e. at least one Ti-containing crystalline phase comprising:
      i. about 2.5-8 wt % of the crystalline phases of the glass-ceramic,
      ii. a morphology exhibiting a length≥about 20 nm, and
      iii. rutile;
   f. an opacity comprising≥about 85% over the wavelength range of 400-700 nm for an about 0.8 mm thickness; and
   g. optionally, one or more crystalline phase comprising:
      i. up to about 10 wt % of the crystalline phases of the glass-ceramic; and
      ii. a spinel structure.

11. The glass-ceramic according to claim 10 wherein the at least one Ti-containing crystalline phase further comprises any one of anatase, a magnesium titanate, an aluminum titanate, or mixtures of rutile and two or more of anatase, a magnesium titanate, and an aluminum titanate.

12. The glass-ceramic according to claim 10, further comprising cordierite or mixtures of rutile, cordierite, and one or more of anatase, a magnesium titanate, and an aluminum titanate.

13. The glass-ceramic according to claim 10, wherein the at least one Ti-containing crystalline phase comprises rutile comprising about 2-6 wt % of the crystalline phases of the glass-ceramic.

14. The glass-ceramic according to claim 10, wherein the one or more β-spodumene solid solutions comprises at least about 75 wt % of the crystalline phases of the glass-ceramic.

15. The glass-ceramic according to claim 10, further comprising:
   a. the optional one or more crystalline phase comprising:
      i. about 1-10 wt % of the crystalline phases of the glass-ceramic and
      ii. a Zn-containing spinel structure.

16. The glass-ceramic according to claim 10, wherein the glass-ceramic comprises at least a portion of at least one of an electronic devices or a portable computing device.

17. The glass-ceramic according to claim 10, wherein the glass-ceramic comprises a color presented in CIELAB color space coordinates for an observer angle of 10° and a CIE illuminant F02 determined from reflectance spectra measurements using a spectrophotometer with specular reflectance included comprising:
   i. CIE a* between −3 and +3;
   j. CIE b* between −6 and +6; and
   k. CIE L* between 88 and 97.

18. The glass-ceramic according to claim 10, wherein the Ti-containing crystalline phase comprises an acicular morphology.

* * * * *